United States Patent
Snyder

(10) Patent No.: US 8,319,950 B2
(45) Date of Patent: Nov. 27, 2012

(54) MULTIPLE-WAVELENGTH CAPABLE LASER RECEIVER

(75) Inventor: Chris W. Snyder, Union City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 532 days.

(21) Appl. No.: 12/581,378

(22) Filed: Oct. 19, 2009

(65) Prior Publication Data

US 2011/0090481 A1    Apr. 21, 2011

(51) Int. Cl.
*G01C 3/08* (2006.01)

(52) U.S. Cl. ...... 356/4.01; 356/3.01; 356/4.1; 356/5.01; 356/5.1

(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | | |
|---|---|---|---|---|
| 4,029,415 | A | * | 6/1977 | Johnson ............ 356/4.08 |
| 4,895,440 | A | * | 1/1990 | Cain et al. ............ 356/5.08 |
| 5,329,347 | A | | 7/1994 | Wallace |
| 5,486,690 | A | | 1/1996 | Ake |
| 5,661,737 | A | | 8/1997 | Hecht |
| 6,947,820 | B2 | * | 9/2005 | Ohtomo et al. ............ 701/50 |
| 7,375,803 | B1 | | 5/2008 | Bamji |
| 7,436,493 | B2 | | 10/2008 | McConville |
| 7,505,119 | B2 | | 3/2009 | Rogers |
| 2008/0266541 | A1 | | 10/2008 | Yung |
| 2009/0046269 | A1 | | 2/2009 | Essling |

* cited by examiner

*Primary Examiner* — Luke Ratcliffe
(74) *Attorney, Agent, or Firm* — Frederick H. Gribbell; Roger P. Kennedy

(57) ABSTRACT

A laser light receiver used to detect pulsed laser light that is produced by a rotating laser light source on a construction jobsite is disclosed. In this manner, the laser receiver acts as an elevation detector and provides an equipment operator, or a construction worker, with the current elevation status with respect to the plane of laser light. The laser receiver is a unitary device that can detect multiple light frequencies/wavelengths, including laser beams that are in the green, red, and infrared spectra. The laser receiver also is capable of discriminating between such laser beams and other interference light sources, particularly fluorescent light sources.

19 Claims, 8 Drawing Sheets

MULTIPLE-WAVELENGTH CAPABLE LASER RECEIVER

TECHNICAL FIELD

The technology disclosed herein relates generally to light sensing equipment and is particularly directed to detecting pulsed laser light of the type which is used on construction sites to detect the equipment elevation with respect to a plane of laser light created by a rotating laser source. Embodiments are specifically disclosed as an elevation detector which provides a mobile user, or an equipment operator, with the current elevation status, as being, for example, too "high," "on grade," or too "low" with respect to the plane of laser light. The elevation detector is a laser light receiver that, as a unitary device, can detect multiple light frequencies/wavelengths, including laser beams that are in the green, red, and infrared spectra. The laser light receiver also is capable of discriminating between such laser beams and other interference light sources, particularly fluorescent light sources.

STATEMENT REGARDING FEDERALLY SPONSORED RESEARCH OR DEVELOPMENT

None.

BACKGROUND

Laser light receivers (also referred to herein as "laser receivers," "laser light detectors," or "light beam receivers") have been available in the past for use in precisely determining the proper elevation on construction job sites. The standard method for using such detectors is to mount a rotating laser light source at a particular elevation on a construction job site, then mount the laser light detector on a piece of equipment (such as on the blade of a bulldozer) to let the operator of the equipment know precisely the elevation of the equipment while it is in use. For example, the laser light detector could be mounted on a pole attached to the blade of a bulldozer, so the operator of the bulldozer could keep the blade at the correct position while grading the land to the precise elevation desired.

To be most effective, a laser light detector would have an easily viewable display that gives the elevation indication to a person who is sited a few feet from the detector. In addition, a laser light detector used on a machine would normally have some type of photosensor (such as a photodiode or other type of photo-sensitive device) on all four corners of the detector's enclosure/housing, so that it could detect laser light coming from any direction. Typical laser light detectors must operate within a one hundred millisecond cycle time, since most rotating laser light sources rotate at 600 rpm.

Many laser sources used as rotating laser light sources operate in either the infrared or red light frequency spectrum. For example, infrared laser diodes operating at 780 nm wavelength are commonly used, as well as red light helium-neon gas lasers, operating at 633 nm wavelength. Moreover, red light laser diodes are now popular in many varieties, which operate at several different wavelengths from 635 nm through 670 nm. In addition, some rotating laser light sources are now available that operate in green light frequency spectrum, such as at a wavelength of 532 nm. The laser light is typically collimated. Various rotating laser light sources are available having beam sizes from as small as one-quarter inch in diameter to at least as large as three-quarter inches in diameter.

Laser light detectors are typically available in two types of models: a "machine control receiver" and a "hand-held receiver". The machine control receiver is typically mounted on a piece of equipment, such as a bulldozer, and used in the manner discussed above. The hand-held receiver is typically a smaller device which can be carried by a typical construction worker to be used to detect the elevation of locations at a moment's notice. It should be noted that a machine control receiver may be used to directly control certain movements of the machine, and thus, that receiver might not include a display.

Currently, there are laser light receivers available on the market that are able to detect light only in the red and infrared (IR) spectra, while other available laser light receivers are able to detect light only in the green spectrum. However, there are no laser light receivers that are capable of detecting all three of these ranges of laser light. This is largely due to the fact that these receivers generally have an optical filter in front of the light sensor that transmits only the narrowest range of wavelengths necessary to allow the desired wavelength of laser light to pass through, while blocking as much of the remaining spectrum of light as possible. This is done to reduce the susceptibility of the unit to unwanted "stray" light, such as light from fluorescent lights, or, to a lesser degree, sunlight. The unwanted light, produced by "interference sources," can sometimes be difficult for the receiver to distinguish from the desired laser light, thus causing erratic and/or errant information to be conveyed from the receiver to the user. Such unwanted light is also referred to herein as an "unwanted interference light signal," or light caused by interference light sources, such as fluorescent lights or strobe lights.

Typical laser receivers used on construction jobsites that are sensitive to only red and IR spectra may have little trouble in rejecting many fluorescent light sources, because most of the fluorescent light output occurs at wavelengths other than the red or infrared spectra. Therefore the optical filters that can be used on such red/IR laser receivers can, by themselves, reject most of the fluorescent light energy before reaching the photosensors mounted on the laser receiver units. It must be recognized, however, that strong fluorescent lights, and also strobe lights, are still able to cause some problems, even for laser receivers that are sensitive only to red/IR light.

However, laser receivers that are sensitive to green laser light must, by their nature, be sensitive to wavelengths that likely will include some of the energy produced by fluorescent light sources. Such laser receivers must either be permanently de-sensitized to the interfering fluorescent "stray" light energy, or must have a sensitivity circuit that can be adjusted to de-sensitize to such interfering fluorescent "stray" light energy. Otherwise, the laser receiver might constantly give false readings every time it is used in an (indoor) environment that includes fluorescent light sources. Since many laser receivers produce an audible "chirp" when detecting electromagnetic (light) energy at their photosensors, due to having some type of piezoelectric "speaker" mounted on board, those types of laser receivers will either constantly, or intermittently, emit a distinctive "chirping" noise when exposed to the interfering fluorescent light sources. When this occurs, the user typically becomes quickly aware that the laser receiver's indications cannot always be trusted, because the on-grade, above-grade, or below-grade readings will not likely be accurate in those operating conditions.

Another method that is sometimes employed to allow a receiver to more readily distinguish the laser light from other light sources is to modulate the transmitted laser light at a specific frequency, and design the receiver so that it "looks" only for light that is modulated at that specific modulation frequency. The disadvantage of this approach is that the receiver becomes more expensive to produce due to the more complex nature of the electronics required to allow the receiver to discern this discrete frequency. Additionally, the laser transmitter becomes a bit more expensive as well, in order to produce this modulated beam. Furthermore, each modulated light receiver would need to be "matched" to a particular model of laser transmitter, and hence such a receiver would not be "universal" in the least.

There are no known laser receiver products that are capable of detecting green laser light, red laser light, and infrared light, all within a single unitary package. This is mainly true because the design considerations for green laser light receivers are quite different than the design considerations for red or infrared laser light receivers. Thus the two different visible light wavelengths that are used in existing transmitters (i.e., green light and red light) have created a chasm that has not been bridged by known laser receivers.

As noted above, currently there are laser receivers on the market that can detect light in the red and infrared (IR) spectra, and other laser receivers that can detect light in the green spectrum only, but not one that works for all three of these ranges of laser light. It would be desirable to have a single laser receiver unit that can effectively detect laser light in all three of these wavelength ranges, as some customers might already have (or need to have in the future) a variety of laser transmitters on-hand that operate at more than one, or all, of these wavelengths. This would not only increase flexibility for the customer, but it would also reduce inventory of the manufacturer and dealer, who otherwise would need to produce and stock different receivers to work with the different wavelengths of laser light.

SUMMARY

Accordingly, it is an advantage to provide a laser receiver that is capable of detecting multiple-wavelength spectra of laser transmitter light, including the green light spectrum and the red light spectrum.

It is another advantage to provide a laser receiver in a unitary package that is capable detecting green laser light, red laser light, and infrared laser light spectra.

It is yet another advantage to provide a laser receiver that can detect laser light in both the green and red visible spectra, while also having a capability of rejecting fluorescent light to an extent necessary to allow for a reasonably long operating range between the receiver and a laser transmitter source.

It is still another advantage to provide a laser receiver in a unitary package that can detect green laser light, red laser light, and infrared laser light, while having a circuit with automatic gain control, such that the receiver will automatically set its operating range sensitivity in accordance with the level of energy being received from the laser transmitter, while still having good fluorescent light rejection capability.

It is a further advantage to provide a unitary laser receiver that is capable of detecting green laser light, red laser light, and infrared laser light, while having user-selectable sensitivity states, which allows a user to manually select a sensitivity state that provides a relatively long operating range from a laser transmitter source, but also allows the user to decrease the sensitivity state as necessary to provide a greater capability for rejecting fluorescent light sources.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a laser light receiver apparatus is provided, which comprises: a processing circuit, at least one photosensor, a variable sensitivity control circuit, an output circuit, and at least one optical filter; wherein: (a) the at least one optical filter exhibits an optical characteristic so as to allow only wavelengths of electromagnetic energy at predetermined transmittance characteristics to pass therethrough to impact upon the at least one photosensor, such that the predetermined transmittance characteristics sufficiently pass wavelengths in both the green and red visible light ranges; (b) the at least one photosensor exhibits a predetermined frequency sensitivity characteristic so as to be sufficiently sensitive to electromagnetic energy in both the green and red visible light ranges; and the at least one photosensor, after receiving a sufficient amount of electromagnetic energy that impacts thereon, outputs at least one first signal to the variable sensitivity control circuit, which modifies the at least one first signal according to a gain state of the variable sensitivity control circuit to produce at least one second signal, and outputs the at least one second signal to the processing circuit; and (c) the laser light receiver is configured: (i) to evaluate the at least one second signal and, based upon a value of the at least one second signal, to determine a relative elevation of the at least one photosensor with respect to the received electromagnetic energy that impacts thereon, and, using the output circuit, to output a third signal to provide an indication of the determined relative elevation; and (ii) to effectively reject an unwanted interference light signal that may be included in the at least one second signal, by inhibiting an output of the third signal by the output circuit and thereby preventing an indication of the determined relative elevation due to such unwanted interference light signal.

In accordance with another aspect, a laser light receiver is provided, which comprises: a processing circuit, at least one photosensor, a variable sensitivity control circuit, an output circuit, and at least one optical filter; wherein: (a) the at least one optical filter exhibits a high-pass wavelength optical transmittance characteristic so as to effectively pass a range of wavelengths of electromagnetic energy above and including a green visible light spectrum through an infrared light spectrum, such that the passed electromagnetic energy will impact upon the at least one photosensor; (b) the at least one photosensor exhibits a predetermined frequency sensitivity characteristic so as to be sufficiently sensitive to electromagnetic energy in a range of visible light above and including green visible light through an infrared spectrum; and the at least one photosensor, after receiving a sufficient amount of electromagnetic energy that impacts thereon, outputs at least one first signal to the variable sensitivity control circuit, which modifies the at least one first signal according to a gain state of the variable sensitivity control circuit to produce at least one second signal, and outputs the at least one second signal to the processing circuit; (c) the laser light detector is positioned within a space so as to intercept pulses of laser light, which represent a desired source of the electromagnetic energy that impacts the at least one photosensor; and (d) the laser light receiver is configured to evaluate the at least one second signal and, based upon a value of the at least one second signal, to determine a relative elevation of the at least one photosensor with respect to the received pulses of laser light that impact thereon, and, using the output circuit, to output a third signal to provide an indication of the determined relative elevation, and can effectively operate as an elevation detector while operating in a fluorescent light environment, by its ability to distinguish the received pulses of laser light from an unwanted interference light signal produced by other light sources.

In accordance with yet another aspect, a method for using a laser light receiver as a relative elevation detector is provided, in which the method comprises the following steps: (a) providing a processing circuit, at least one optical filter that receives pulses of laser light energy, at least one photosensor, a variable sensitivity control circuit, and a housing, all combined as a unitary device; (b) passing a portion of electromagnetic energy, including the received pulses of laser light energy, through the at least one optical filter, in which the passed portion of electromagnetic energy is controlled by predetermined transmittance characteristics of the at least one optical filter, such that the predetermined transmittance characteristics sufficiently pass wavelengths in both the green and red visible light ranges; (c) allowing the passed portion of electromagnetic energy to impact upon the at least one photosensor, in which the at least one photosensor exhibits a predetermined frequency sensitivity characteristic so as to be sufficiently sensitive to electromagnetic energy in both the green and red visible light ranges; (d) producing at least one first signal by the at least one photosensor, after receiving a sufficient amount of electromagnetic energy that impacts thereon, and directing the at least one first signal to the variable sensitivity control circuit; (e) modifying, by the variable sensitivity control circuit, the at least one first signal according to a gain state of the variable sensitivity control circuit, and producing at least one second signal, and directing the at least one second signal to the processing circuit; (f) evaluating the at least one second signal and, based upon a value of the at least one second signal, determining a relative elevation of the at least one photosensor with respect to the received pulses of laser light energy that impact thereon; (g) indicating the determined relative elevation; and (h) effectively rejecting an unwanted interference light signal that may be included in the at least one second signal, by preventing the unwanted interference light signal from causing a false indication of the determined relative elevation.

In accordance with still another aspect, a laser light receiver is provided, which comprises: a processing circuit, at least one photosensor, a variable sensitivity control circuit, and at least one optical filter; wherein: (a) the at least one optical filter exhibits an optical characteristic so as to allow only wavelengths of electromagnetic energy at predetermined transmittance characteristics to pass therethrough to impact upon the at least one photosensor; (b) the at least one photosensor exhibits a frequency sensitivity characteristic so as to be sufficiently sensitive to electromagnetic energy at predetermined frequency response characteristics; and the at least one photosensor, after receiving a sufficient amount of electromagnetic energy that impacts thereon, outputs at least one first signal to the variable sensitivity control circuit, which modifies the at least one first signal to produce at least one second signal, and outputs the at least one second signal to the processing circuit; (c) a combination of: (i) the predetermined transmittance characteristics of the at least one optical filter; (ii) the predetermined frequency response characteristics of the at least one photosensor; and (iii) amplification characteristics of the variable sensitivity control circuit, produces an overall operating sensitivity characteristic at various wavelengths of received electromagnetic energy, such that the laser light receiver exhibits an overall operating sensitivity characteristic at green visible light wavelengths that is substantially reduced compared to an overall operating sensitivity characteristic at infrared light wavelengths, while still effectively detecting electromagnetic energy in all three wavelength ranges of: green visible light, red visible light, and infrared light; and (d) the laser light receiver is configured: (i) to evaluate the at least one second signal and, based upon a value of the at least one second signal, to determine a relative elevation of the at least one photosensor with respect to the received electromagnetic energy that impacts thereon for all three wavelength ranges of: green visible light, red visible light, and infrared light of the received electromagnetic energy, and (ii) to output a third signal to provide an indication of the determined relative elevation.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
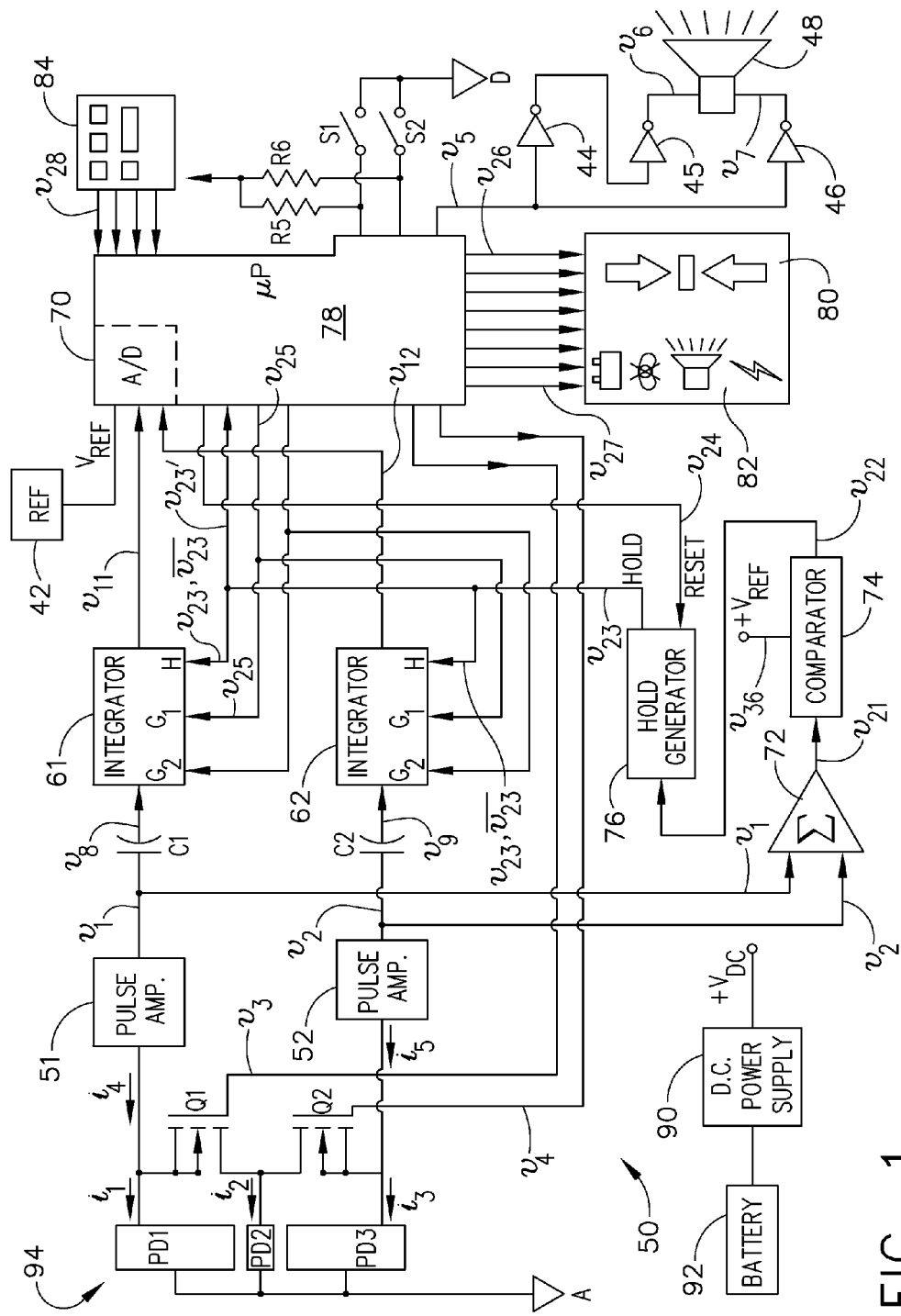
FIG. 1 is a block diagram of a first embodiment of a laser light detector constructed in accordance with the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to the drawings, FIG. 1 depicts a block diagram of a first embodiment, showing a laser light detector 50 as having three photo-detectors as input sensors that are combined into two channels, appropriate amplifiers and other signal conditioning, and at least two display outputs driving an elevation display and a status display. In the illustrated embodiment of FIG. 1, two of the photocells PD1 and PD3 are much larger in surface area than the center photocell PD2, and these three photocells make up a photodiode array 94. The three photocells are connected to transistors Q1 and Q2, which are field-effect transistors that can switch the current path i2 produced by photocell PD2 to be in parallel with either the current path i1 produced by photocell PD1 or the current path i3 produced by photocell PD3. The switching of transistors Q1 and Q2 is controlled by voltage signals depicted by the voltages v3 and v4. Transistors Q1 and Q2 are preferably mounted on the same substrate, thereby making it possible for a single integrated circuit chip to contain both transistors. A suitable integrated circuit for this purpose is available as part number SI9956DY, manufactured by Siliconix Inc., located in Santa Clara, Calif.

The resultant currents, designated i4 and i5, are then amplified by individual pulse amplifiers 51 and 52, which produce output voltages v1 and v2, respectively, which in turn are integrated by pulse integrator and automatic gain control circuit 61 and 62, respectively. Two analog voltages v11 and v12, respectively, are produced by the output of integrators 61 and 62, and these voltages have a magnitude which is proportional both to the intensity of the laser light striking the photocells PD1, PD2, and/or PD3 and to the time duration during which the light was striking those photodiodes.

Figure 3:
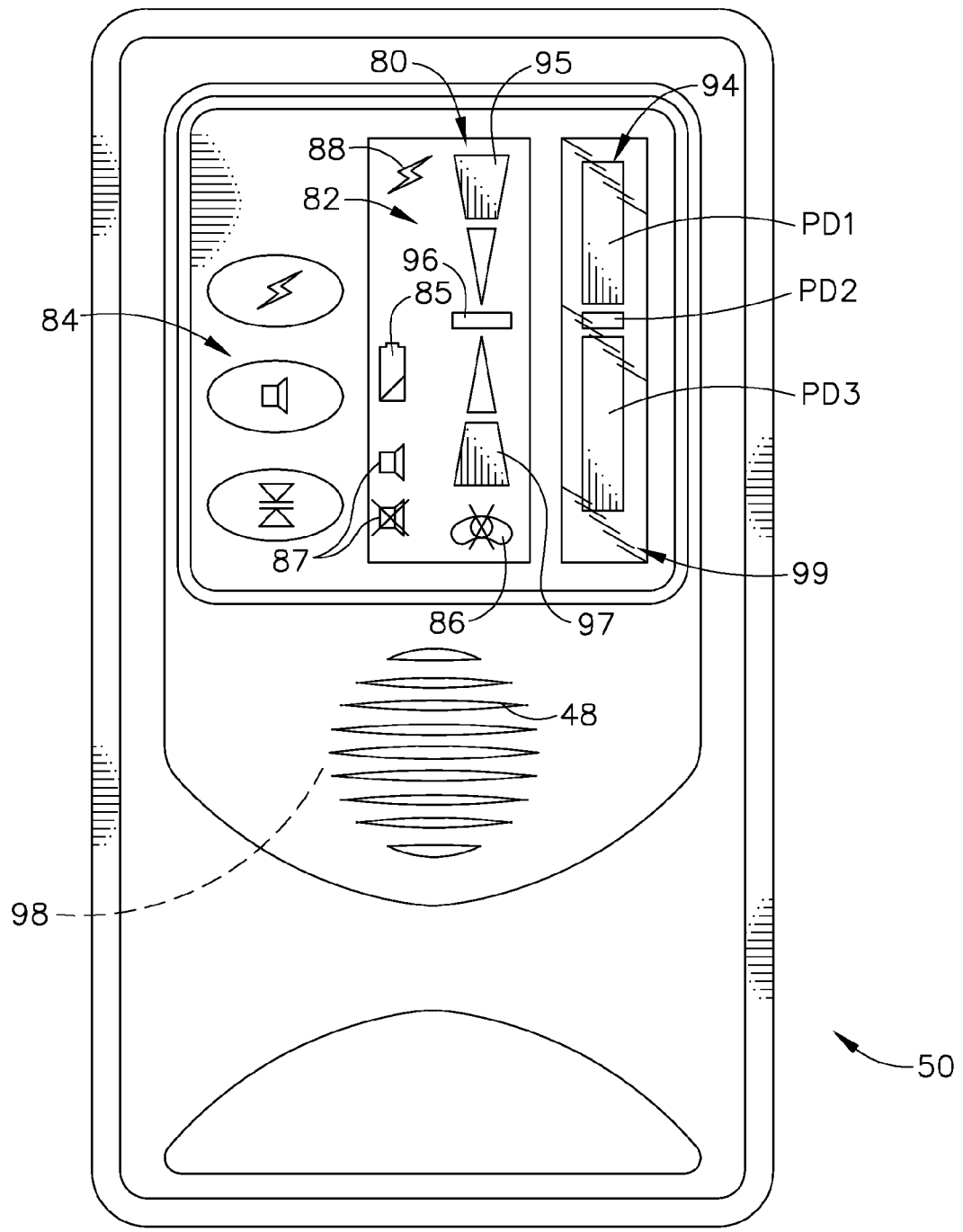
FIG. 3 is an elevational front view of the laser light detector of FIG. 1.

A possible physical layout of the photocells of photodiode array 94 is illustrated in FIG. 3, in which photocell PD1 is positioned on a housing or enclosure directly above the smaller central photocell PD2, which in turn is positioned on the housing/enclosure directly above another large photocell PD3, such that all three photocells are positioned and having a center line that is a vertical line. Each photocell is preferably a silicon photodiode, and possible length and width dimensions of photocells PD1 and PD3 are 0.2 inches (5.1 mm) by 0.8 inches (20.3 mm).

As can be seen in FIG. 3, the longer dimension of photodiodes PD1 and PD3 is preferably in the vertical direction. The central photodiode PD2 may have the dimensions of 0.1 inches (2.5 mm) by 0.2 inches (5.1 mm), and typically is precisely positioned so that a gap is formed between its upper edge and the lower edge of photocell PD1, and also has a precise gap between its lower edge and the upper edge of photocell PD3. The physical sizes for photocells PD1 and PD3 are determined in view of the range of laser light spot sizes typically found on construction jobsites. Various rotating laser light sources are available in the industry, and they range from spot sizes at their source of ¼ inch (6.3 mm) to ¾ inch (19.0 mm) The smaller laser spot sizes tend to diverge more as their distance increases from the source.

Further details about the dimensions of the photocells and the gaps therebetween are available in U.S. Pat. No. 5,486,690, which is incorporated herein by reference in its entirety. This patent is titled, "METHOD AND APPARATUS FOR DETECTING LASER LIGHT," and is assigned to Apache Technologies, Inc., now Trimble Navigation Limited.

The electronic circuit of laser light detector 50 is designed to switch the current i2 that is created by photocell PD2 so that it is combined with either current i1 or i3 by use of switching transistors Q1 and Q2. In a typical application using laser light detector 50, a rotating laser (not shown) is positioned on a construction jobsite at a particular elevation. A plane of rotating laser light is generated by this rotating laser, and laser light detector 50 is positioned within that plane of laser light so that it will be able to detect the laser light when such light strikes its photodiode array 94. Laser light detector 50 can be carried by a human hand so that it can be precisely positioned at any point within the construction job site, or it can be attached to a particular piece of construction equipment such as a bulldozer.

Transistor Q1 is switched into its conducting state before one of the laser light sweeps impacts against photodiode array 94, and therefore current i1 and current i2 are combined into a single larger current i4, which is essentially the sum current produced by photocells PD1 and PD2. If the energy received by the three photocells of photodiode array 94 are given the designations "A" for photocell PD1, "B" for photocell PD2, and "C" for photocell PD3, then the transfer function for this first sweep of laser light is equal to $[(A+B)-C] \div (A+B+C)$. After the first sweep occurs, transistor Q1 is switched off and transistor Q2 is switched on (into its conducting state), and the current i2 produced by photocell PD2 is combined with i3 to form a new current i5, which is the combined current produced by photocells PD2 and PD3. This configuration will remain in place until a second sweep of laser light impacts photodiode array 94, at which time a new transfer function for this null detecting application will be [A−(B+C)]÷(A+B+C). After the second sweep occurs, then the transistors are switched again so that laser light detector 50 goes back to the first transfer function related above.

The physical layout of the first embodiment laser light detector 50 is depicted in FIG. 3. In the illustrated embodiment of FIG. 3, photodiode array 94, which contains the three photocells PD1, PD2, and PD3, is located at an upper, exposed area of the front surface of Laser light detector 50, which is physically small enough that it is portable and can be easily held by the human hand in a position to receive the rotating laser light upon its front surface. It will be understood that further photodiode arrays could be located on other surfaces of laser light detector 50 if desirable.

The area containing the photodiode array 94 is preferably covered by a window that comprises an optical filter 99. In this first embodiment 50, the optical filter 99 has a light transmittance characteristic that preferably corresponds to one of the curves 290 and 292 on FIG. 8. The details of this preferred light transmittance characteristic will be discussed below. In essence, the optical filter passes a portion of electromagnetic energy therethrough, including received pulses of laser light energy; the passed portion of the electromagnetic energy is controlled by predetermined transmittance characteristics of the filter.

An LCD (liquid crystal display) 80 is provided on laser light detector 50 that contains an above grade indicator 95, and on-grade indicator 96, and a below grade indicator 97. As related above, if the center of the laser beam spot strikes photodiode array 94 below upper dead band edge and above lower dead band edge, then the on-grade indicator 96 will be illuminated. On the other hand, if the center of the laser light spot is striking photodiode array 94 above the upper dead band edge, then the below grade indicator 97 will be illuminated, and if the center of the laser light spot strikes photodiode array 94 below the lower gap, then the above grade indicator 95 will be illuminated.

Laser light detector 50 also includes a liquid crystal display 82 that indicates various optional settings chosen by the set-up operator of the equipment. Liquid crystal display 82 can indicate the battery condition, using the symbol indicated by index numeral 85, display a warning that the transmitter of the laser light is not level, using the symbol indicated by index numeral 86, and display whether the audio speaker is turned on or off, using the symbols designated by index numeral 87. A keypad 84 is used to select the various optional settings available in laser light detector 50, and it can be used to enter input data to a processing circuit. The keys on keypad 84 are examples of user-actuated control input devices. It will be understood that many other symbols could be added to liquid crystal display 82 for indicating other information.

U.S. Pat. No. 5,486,690 discusses many circuit details of an early embodiment that uses this circuit design, and all of those details will not be repeated herein. The overall circuit design is beneficial for use as a first embodiment, including the use of automatic gain control for determining the sensitivity of the laser receiver 50 when detecting laser light pulses from a particular laser transmitter located at a particular distance from the receiver. However, the circuit design as illustrated in FIG. 1 will be described in detail herein.

When photocell PD1 (with or without the combination of photocell PD2) receives a laser light signal from the rotating laser light source, the current generated i1 is essentially an AC signal. As the rotating laser light strikes photodiode PD1, a short pulse of current i1 flows past the source of transistor Q1, at which time it may be combined with a similar current pulse i2 from photocell PD2 which flows through Q1 if in its conducting on state. Currents i1 and i2 become a combined current i4. Pulse amplifier 51 is designed to amplify this current pulse i4 and convert it into a corresponding positive-going voltage pulse v1. Both pulse amplifiers 51 and 52 produce a voltage output v1 and v2, respectively, at times when these pulse amplifiers receive a current pulse i4 or i5, respectively.

If laser light detector 50 includes more than one array of photocells, then each of those arrays would be connected in parallel such that the top-most photocell of the first array is connected in parallel to the top-most photocell of each of the other arrays, all being connected to the source of transistor Q1, and continuing as current i4. Similarly, all of the middle photocells PD2 are connected in parallel so that all of these connections meet where current i2 is indicated on FIG. 1, and are connected to the drains of transistors Q1 and Q2. Furthermore, all of the lower-most photocells PD3 are connected in parallel together to join at the source of transistor Q2 and to further continue as a current i3. It will be understood that the overall principles of operation of laser light detector 50 are not affected by the number of arrays of photocells that can receive the rotating laser light.

As can be seen in FIG. 1, current i4 is converted into a voltage v1 by the pulse amplifier 51 for Channel 1, which continues through an AC coupling capacitor C1 (and becoming a voltage signal v8) into pulse integrator and automatic gain control circuit 61, which then outputs a voltage level v11. Channel 2 has corresponding components that take voltage v2 through an AC coupling capacitor C2, thereby producing voltage v9, and into another pulse integrator and automatic gain control circuit 62, which outputs a voltage level v12. More such channels of pulse amplifiers and integrators could be added to laser light detector 50 if desirable, however, since this application is merely trying to determine one particular dead band location, only two channels of information are needed at this point. It will be understood that a third pulse amplifier (not shown) and a third integrator/automatic gain control circuit (not shown) could be directly connected to photocell PD2, while eliminating switching transistors Q1 and Q2. By use of such a variation in the circuitry of laser light detector 50, the position of the center of the laser light spot could be determined on each sweep of the rotating laser light source impacting against photodiode array 94, rather than having to wait for two sweeps of the rotating laser light source, as in the depicted circuit of FIG. 1. In this configuration, the center photocell PD2 would preferably have its voltage (representative of the light impacting PD2) added to the voltages output from both photocells PD1 and PD3, respectively, and this would occur after each sweep of the rotating laser light source.

Each of the DC voltage levels v11 and v12 are individually connected to an analog-to-digital (A/D) converter 70, which is an integral component of a microprocessor (or perhaps more correctly, a "microcontroller") 78. Capacitor C1 and C2 are DC-blocking capacitors, only allowing the AC component of voltages v1 and v2 to become voltage signals v8 and v9. On the other hand, voltages v11 and v12 are DC signals, designed to interface directly into A/D converter 70. A reference voltage +VREF is also provided to the A/D converter, at reference numeral 42.

A preferred microprocessor (or microcontroller) 78 includes on-board RAM (random access memory), ROM (read only memory), and several parallel input/output ports which are used to communicate to various address, data, and control lines. The microprocessor 78 determines a digital number produced by A/D converter 70, which represents the light energy and duration of the laser light pulse received by the photodiode array 94. This can be determined for each channel individually, thereby providing different numeric values for the light imaging levels represented by voltages v11 and v12.

Each of the output signals from pulse amplifiers 51 and 52 (signals v1 and v2, respectively) are directed into a voltage summation amplifier 72. The summation of voltages v1 and v2 appears at the output of summation amplifier 72, and has the designation v21. A voltage comparator circuit 74 compares v21 to a reference voltage (or "threshold voltage") v36, also called +VREF. The output voltage from comparator circuit 74 is designated v22, which is a digital signal that is maintained at logic 0 if no light beam is touching any of the photodiodes of the photodiode array 94 of laser light detector 50. Once enough light energy is detected by the photodiode array 94, the comparator circuit 74 will change its output state, to logic 1. By use of the summation amplifier 72 and voltage comparator 74, laser light detector 50 measures the total energy of all the photodiodes combined to determine the logic state of v22.

The output signal of v22 from comparator 74 is directed into a Hold Generator 76, which uses two stages of J-K flip-flops and several states of NAND gates to produce "HOLD" signals v23 and v23'. HOLD signal v23 is directed back to each pulse integrator circuit 61 and 62, and HOLD signal v23' is directed to microprocessor 78. HOLD signals v23 and v23' both operate in the same manner but have different voltage levels for their logic 0 and logic 1 states.

HOLD signal v23 is a digital signal which remains in a logic 1 state while waiting for a light pulse to strike laser light detector 50. Once enough light energy is detected by the photodiodes of laser light detector 50 to force comparator output signal v22 to change state, HOLD signal v23 remains in its logic 1 state until the end of the light pulse is detected, at which time it will change to its logic 0 state. This occurs when the comparator output signal v22 drops back to its logic 0 state. The HOLD signal v23 now remains in its logic 0 state until a "RESET" signal v24 is received from microprocessor 78. Once this RESET signal is received, the J-K flip flops of Hold Generator 76 are reset to their initial output states, and the HOLD signal v23 transitions back to its logic 1 state. There is also an inverted HOLD signal on the drawings, and is also referred to as "NOT v23". Inverted signal NOT v23 is another digital logic signal and is always in the opposite logic state from v23.

Figure 2:
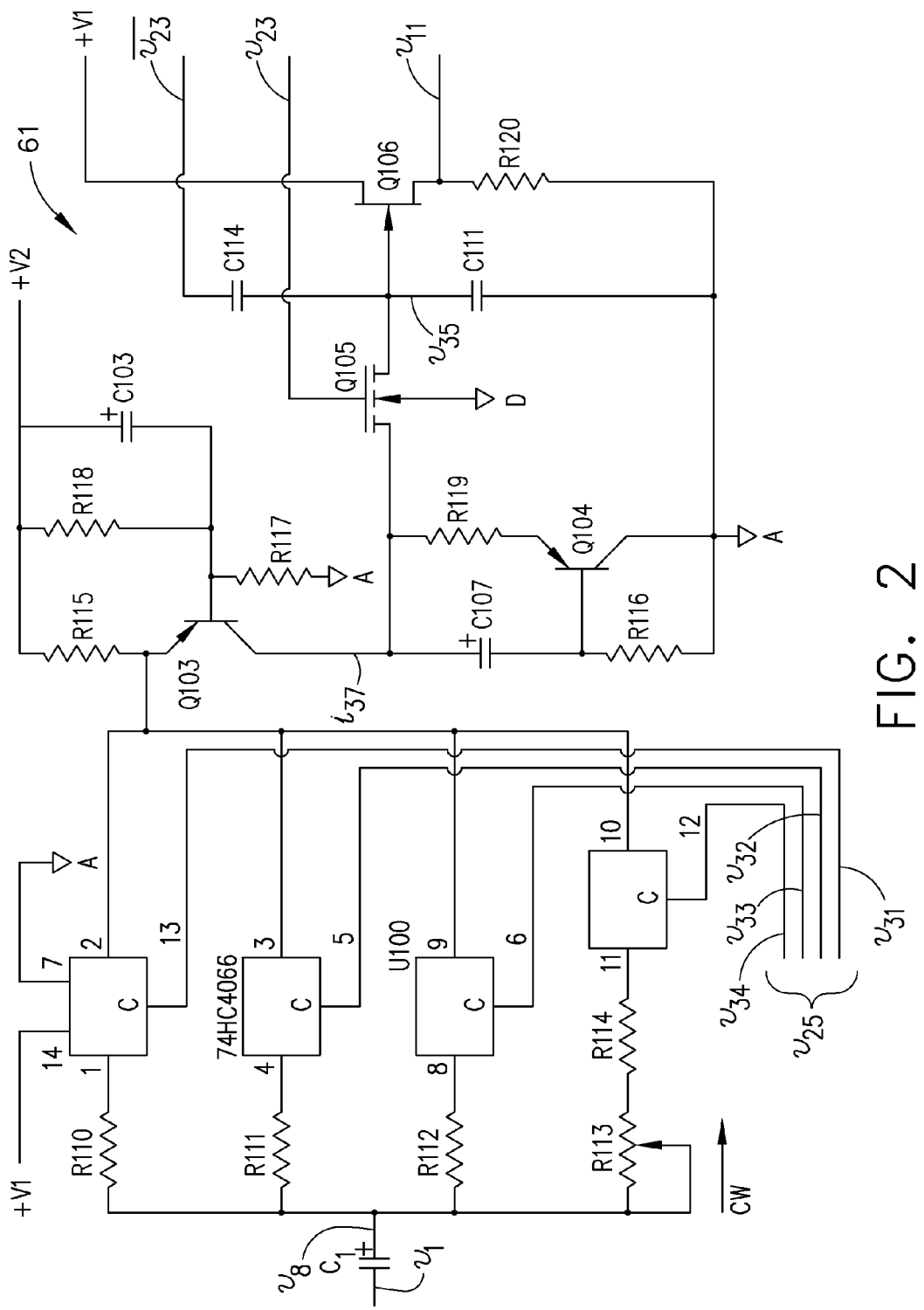
FIG. 2 is a schematic diagram of the Pulse Integrator and Automatic gain Control circuit of each input channel of the laser light detector of FIG. 1.

The operation of the pulse integrator and automatic gain control circuit 61 (for input channel 1) will now be discussed, while referring to FIG. 2. The pulse amplifier output signal v1 is AC coupled into the pulse integrator and automatic control circuit 61 via capacitor C1, and its AC component continues through C1 as a voltage signal v8. At this point, voltage signal v8 is channeled through one of four analog switches U100, which is preferably a CMOS integrated circuit having the part number 74HC4066 (a four-channel analog switch). The use of analog switch U100 allows the gain of this circuit to be variable (i.e., its "gain state"), by the use of four different gain resistors R110, R111, R112, and R114. As can be seen in FIG. 2, resistor R114 is combined in series with a potentiometer R113, to create one in-series resistance.

Microprocessor 78 determines which of the analog switches is to be closed by use of its GAIN command signal v25, which comprises four individual voltage signals v31, v32, v33, and v34. If the highest gain is desired, then v34 will be placed in its logic 1 state while signals v31 through v33 are held in their logic 0 states. If the lowest gain is desired, then v31 will be placed in its logic 1 state, while the other three signals are held in their logic 0 states.

In the illustrated embodiment of FIG. 2, the gain ratios are as follows: 1.0 4.97: 16.5: 39.1. It will be understood that different gain values can be chosen depending upon the exact requirements of a given laser light detector. The method of determining which gain (or "gain state") is to be chosen by microprocessor 78 will be discussed in detail hereinbelow.

The combination of the four various gain resistors and the four analog switches comprise the input stage for a common base amplifier that is based upon transistor Q103. This common base amplifier is a transconductance amplifier that converts a voltage input signal into a current output signal, and has a high output impedance. The collector of Q103 produces a current signal having the designation i37 which includes both the "signal" current due to light pulses striking laser light detector 50, and to "noise" current due to transient noise and solar noise that may have penetrated to this part of the circuit, and additionally includes the quiescent current. Note that laser light detector 50 has two different common points, an analog common "A" and a digital common "D", which are commonly connected but have separate common planes.

The combination of capacitor C107, resistors R116 and R119, and transistor Q104 comprise a large inductance equivalent which shunts away any DC bias current contained in current signal i37. Transistor Q105 is an n-channel field effect transistor (FET) which is either turned on or off by the HOLD signal v23, which is connected to the gate input of Q105. As discussed hereinabove, the HOLD signal v23 is at a logic 1 state while waiting for a light pulse to occur and during the light pulse's occurrence. Therefore, Q105 is turned on during the same time periods, thereby allowing the portion of current signal i37 other than bias current to pass through the drain and source of Q105.

As current signal i37 passes through Q105, it tends to charge capacitor C111 with a voltage having the designation v35. JFET Q106 is a voltage follower circuit having a high input impedance and a low output impedance. Current signal i37, which is charging capacitor C111, directly produces voltage v35 in the same manner as a classic integrator circuit, and, therefore, when i37 is in a positive pulse state, voltage v35 will ramp up at a near constant slope.

During the time periods when i37 is not in a positive pulse mode (meaning that no light input is being received by laser light detector 50), then the only signal component of i37 is a noise component which either charges or discharges capacitor C111, depending on the instantaneous polarity of the noise. Over time, the average integration of noise equals zero, and therefore, the integrator used in this portion of laser light detector 50 provides a much greater signal-to-noise ratio then would otherwise be achieved with mere gain amplification.

Once the signal portion of i37 starts to charge capacitor C111, a positive ramp voltage v35 begins to ramp up at a slope determined by the magnitude of i37. During this positive pulse, the ramping up continues as long as Q105 is turned on, which remains the case as long as the HOLD signal v23 remains in its logic 1 state. When the light pulse is no longer detected by comparator 74, HOLD signal v23 drops to its logic 0 state, thereby turning off transistor Q105. At this point, capacitor C111's voltage v35 remains at its previous level for a long enough time period for its voltage to be measured by the remainder of the circuitry of laser light detector 50.

Since transistor Q106 is part of a voltage follower circuit, it produces an output voltage v11 which is equal to voltage v35 except for a certain bias offset voltage. The inverted voltage signal NOT v23 is used to partially correct the charge which is drawn from C114 through the gate-channel capacitance of Q105 when v23 changes state. Since v35 is held at a constant voltage after the light pulse disappears, similarly so does voltage v11, which is directed to the input of A/D converter 70. Noting the fact that both input channels of the illustrated embodiment of laser light detector 50 are simultaneously sending such voltage signals v11 and v12 to A/D converter 70, it can be thus seen that microprocessor 78 can determine the precise voltage level of each of the input channels of the photodiode arrays by sequentially sampling the output values provided by A/D converter 70. It will be understood that A/D converter 70 could be a separate integrated circuit with a multiplexed input for v11 and v12, or there could be a separate A/D converter for each input channel.

Since the time duration that a light pulse is received by the photodiode array of laser light detector 50 is variable, depending upon the distance laser light detector 50 is located from the rotating laser light source, it is important that the voltage signal v35 does not saturate as capacitor C111 is charged. The automatic gain control circuit portion of FIG. 2 is used to precisely avoid this problem, under the control of microprocessor 78. Since the gain can be easily controlled in this manner, the pulse integrator and automatic gain control circuit 61 can accommodate a very large pulse width range, typically from as little as 0.5 microseconds to as much as 0.5 milliseconds. By use of this circuit, the dynamic range of the pulse integrator and automatic gain control circuit 61 is at least 30,000 to 1. This is a distinct advantage over many previous designs, particularly in view of the fact that the signal-to-noise ratio of laser light detector 50 is greatly improved.

Some of the functions of microprocessor 78 will now be discussed in detail. As related hereinabove, microprocessor 78 receives a HOLD signal v23' at the end of each received light pulse. After this occurs, microprocessor 78 reads the output values of A/D converter 70 while scanning through both input channels of the illustrated embodiment. After scanning both input channels, microprocessor 78 stores the A/D converter information for each of the channels. Once microprocessor 78 determines whether the center of the laser light spot is on-grade, above grade, or below grade, the microprocessor resets the Hold Generator 76 by outputting a RESET signal v24. This sequence of events occurs after laser light detector 50 starts to receive light signals from a rotating laser light source.

When laser light detector 50 is first turned on, and before it starts to receive any laser light signals, microprocessor 78 performs the following initialization functions:

(1) The circuit defaults to the highest gain state, meaning that the high gain command v34 is activated to close the analog switch will allow current to pass through resistor R114.
(2) Microprocessor 78 periodically samples the output values of both input channels from A/D converter 70. The numeric value representation of each of these two input channels is then stored in RAM, which allows microprocessor 78 to keep track of the quiescent bias voltage of the integrator circuits 61-62 of each of the input channels.
(3) Microprocessor 78 controls LCD display 80, via signals v26, such that no information about the present elevation is displayed on that LCD display. During the time that light pulses are received by laser light detector 50, LCD display 80 will display some type of grade indication, so that the human operator can ascertain the present elevation as compared to the rotating plane of laser light.

Once the first light beam strikes photodiode array 94, the HOLD signal becomes active (at the end of the light pulse), and microprocessor 78 immediately samples both input channels using A/D converter 70. Each channel is received as a numeric value and the previous quiescent bias level of each channel (which was previously stored in RAM) is subtracted from the new numeric value received from A/D converter 70. This subtraction results in a new net numeric value for each of the input channels, which is used in a "position" calculation, by use of the following preferred equation:

$$R = \frac{K_1 CH_1 + K_2 CH_2}{CH_1 + CH_2}$$

Where:
CHx=the net numeric A/D converter value, per input channel;
R=a numeric position result, in the range of 0-1FF16;
Kx=constants which are stored in microprocessor 78.

The above equation calculates a weighted average in which the various constants Kx, can be given values that provide a purely linear result, or can provide a different (non-linear) result depending on which options are chosen by the equipment set-up operator. In the illustrated embodiment, constants Kx can be chosen as follows:

As can be seen from the above equation and values for constants Kx, the minimum numeric value for the position result R is 016, and the maximum value is 1FF16. The various options can affect the way the results are interpreted, which will be discussed in detail hereinbelow. It will be understood that a different equation could be used to calculate a numeric result other than a weighted average without departing from the principles of the technology disclosed herein.

After the position calculation has taken place, the calculated position R of the laser light strike will be indicated on LCD display 80. This position, however, will probably not be accurate if at least one of the input channels of the A/D converter 70 is saturated. Since the highest gain state is chosen before the first beam strike occurs, it will be quite likely that at least one of these input channels will be saturated.

More accurate data can be displayed after the next laser light strike, using the following procedure: after each of the laser light strikes occurs, microprocessor 78 scans the stored data for each of the A/D channels to determine the maximum numeric value of any one channel, which will be given the designation "X" for this discussion. Since the preferred A/D converter 70 is a 10-bit A/D converter, its numeric output is in the range of 0-102310. "Y" is a fixed number in memory (in the computer program stored in ROM) which is just less than the maximum possible number of 102310. If X is greater than Y, then microprocessor 78 will reduce the gain state by one step, if possible. Of course, if laser light detector 50 is already at its minimum gain state, then the input circuits will have to continue operating while one or more of the input channels is in a saturated state.

"W" is another fixed number stored in memory (ROM) which is just greater than the minimum possible output value of zero (0) from A/D converter 70. If X is less than W, then microprocessor 78 will increase the gain state by one, if possible. Again, if it is not possible to increase the gain state by one (i.e., laser light detector 50 is already operating at its maximum gain state), then laser light detector 50 will have to continue operating using data which is very low in voltage level.

Any change in gain state, if it occurs, will take place much in advance of the next expected light strike of the photodiode arrays of laser light detector 50. Since most rotating laser light sources operate at 600 rpm, there is typically one hundred milliseconds of time between the expected light pulse receptions. By use of the automatic gain state control functions described above, it can be seen that the combination of the processing circuit 78 and the automatic gain control circuit 51 acts as a variable sensitivity control circuit for the laser light receiver 50.

Since there are only two input channels in the illustrated embodiment of laser light detector 50, microprocessor 78, or at least its A/D converter 70, is not necessarily required to determine the location of the center of the laser light spot impacting upon photodiode array 94. Since the voltage magnitudes of signals v11 and v12 are directly proportional to the intensity of laser light received at each input channel (which produce current signals i4 and i5, respectively), it is only necessary to determine which voltage signal has the greater magnitude to find the location of the center of the spot of the impacting laser light. A simple voltage comparator (not shown) could be used in determining which signal magnitude is greater, either v12 or v12. Depending upon which transistor Q1 or Q2 is presently turned on, the comparator would determine whether the laser spot centerline is above or below either upper gap or lower gap.

A keypad 84 is used to choose the various options available in laser light detector 50, using signals v28 that are received by microprocessor 78. Some of the options are to provide indications such as low battery, laser transmitter out of level, speaker on or off. The status of each of these options is displayed on liquid crystal display 82 which is controlled by microprocessor 78 via signals v27.

Laser light detector 50 includes a speaker 48 that is activated by voltage signal v5 controlled by microprocessor 78. The signal passes through digital inverters 44, 45, and 46, providing signals v6 and v7. Speaker 48 is preferably used to indicate whether or not the laser light spot centerline is on-grade with respect to the laser light detector 50. For example, the speaker 48 can "beep" at a "fast" rate when laser light detector 50 is above grade, a "slow" rate when laser light detector 50 is below grade, and a continuous tone when laser light detector 50 is on-grade.

In addition, speaker 48 can be used to indicate that the laser light source is out-of-level. The rotating light source typically sweeps at a rate of 600 RPM (revolutions per minute). However, if the light source detects that it is out-of-level, then its sweep rate typically falls to 300 RPM. Laser light detector 50 will notice this slower sweep rate, and speaker 48 will preferably output a tone of a different frequency than normal, or will "beep" at a much slower rate. In addition, indicator 86 of liquid crystal display 82 would also provide a visual indication of this problem.

As related above, speaker 48 can be deactivated by use of a keypad command, and its activated or deactivated status is indicated by liquid crystal display 82 (at reference numeral 87). In some applications, it is desirable to have the audible output of speaker 48 to be quite loud, and a typical low voltage AC or DC SONALERT™ is provided having a very loud output value. On the other hand, in indoor environments, the loud audio output would preferably be attenuated to a much lower audible level, and laser light detector 50 can be optionally provided with a tuned cavity 98 that has a resonant frequency equal to the normal audio frequency of speaker 48. If an attenuated audio output is desired, then the frequency of the audio signal at voltages v6 and v7 can be significantly increased or decreased, thereby causing speaker 48 to operate at a frequency that is not within the resonant frequency of tuned cavity 98, which has the effect of greatly attenuating the sound level output from laser light detector 50. In this manner, laser light detector 50 can be used both indoor and outdoors, and this selection can be made without the need for any moving parts. The selection can be made through keypad 84, and its indication would be visible at index numeral 88 on liquid crystal display 82.

It will be understood that the above-described options are merely examples of some of the features that can be provided for laser light detector 50. Many other options can be added to the circuit of laser light detector 50 without departing from the principles taught by the technology disclosed herein. For example, the signals v26 and v27 that drive the display symbols 80 and 82 on FIG. 1 could instead be used to drive a machine, in a "machine control" mode of operation, and the signals v26 and/or v27 could be produced by an output circuit that includes any necessary signal conditioning.

In the machine control mode, an alternative laser light detector may not require any type of display, since the output signals v26 and/or v27 produced by an alternative laser light detector 50 could be used to directly control certain movements of the machine itself. Moreover, the machine control output signals v26 and/or v27 could be provided as proportional signals, rather than pure digital signals, if desired. (It will be understood that such a proportional signal might be in the form of a numeric binary signal, either as a parallel multi-bit signal, or a serial data stream signal.)

As is common in electronic circuits, a multi-voltage DC power supply 90 is provided with laser light detector 50, and provides output voltages designated +VDC, +V1, and +V2 on the drawings. This DC power supply can be hooked into the battery 92 of the equipment that laser light detector 50 is attached to. If a cable-less installation is desired, then DC power supply 90 can run on its own internal batteries.

Laser light detector 50 can be used with configurations and hardware other than described hereinabove. For example, instead of being provided with a liquid crystal display 82, the symbols of liquid crystal display 82 could be formed of LEDs or incandescent lights. In addition, the battery 92 need not be provided if the laser light detector 50 is to be permanently mounted onto a machine, such as a bulldozer.

Another configuration of laser light detector 50 is to use voltage comparators instead of an A/D converter to determine the null points of the dead band edges, as described hereinabove. It should be noted that the use of comparators instead of the A/D converter and a microprocessor would make it more difficult to compensate for the initial quiescent integrator conditions. Of course, the comparator configuration would be less expensive to produce, and could still be used in conjunction with a microprocessor that would still control the display and the switching of the transistors Q1 and Q2 of the photodiode array 94. On the other hand, the microprocessor itself could be eliminated if digital logical were substituted. One way of implementing such digital logical would be to use programmable logic state integrated circuits. Such digital logic could control the switching of the transistors Q1 and Q2 as well as controlling LCD display 82 and LCD display 80. In fact, with enough digital logic, all of the functions normally controlled by the microprocessor could be implemented.

It will be understood that the physical layout of the laser receiver 50 that is depicted in FIG. 3 can be modified to a great extent while performing all of the important functions that are discussed above, and thus such modifications would fall within the teachings of the technology disclosed herein.

Figure 4:
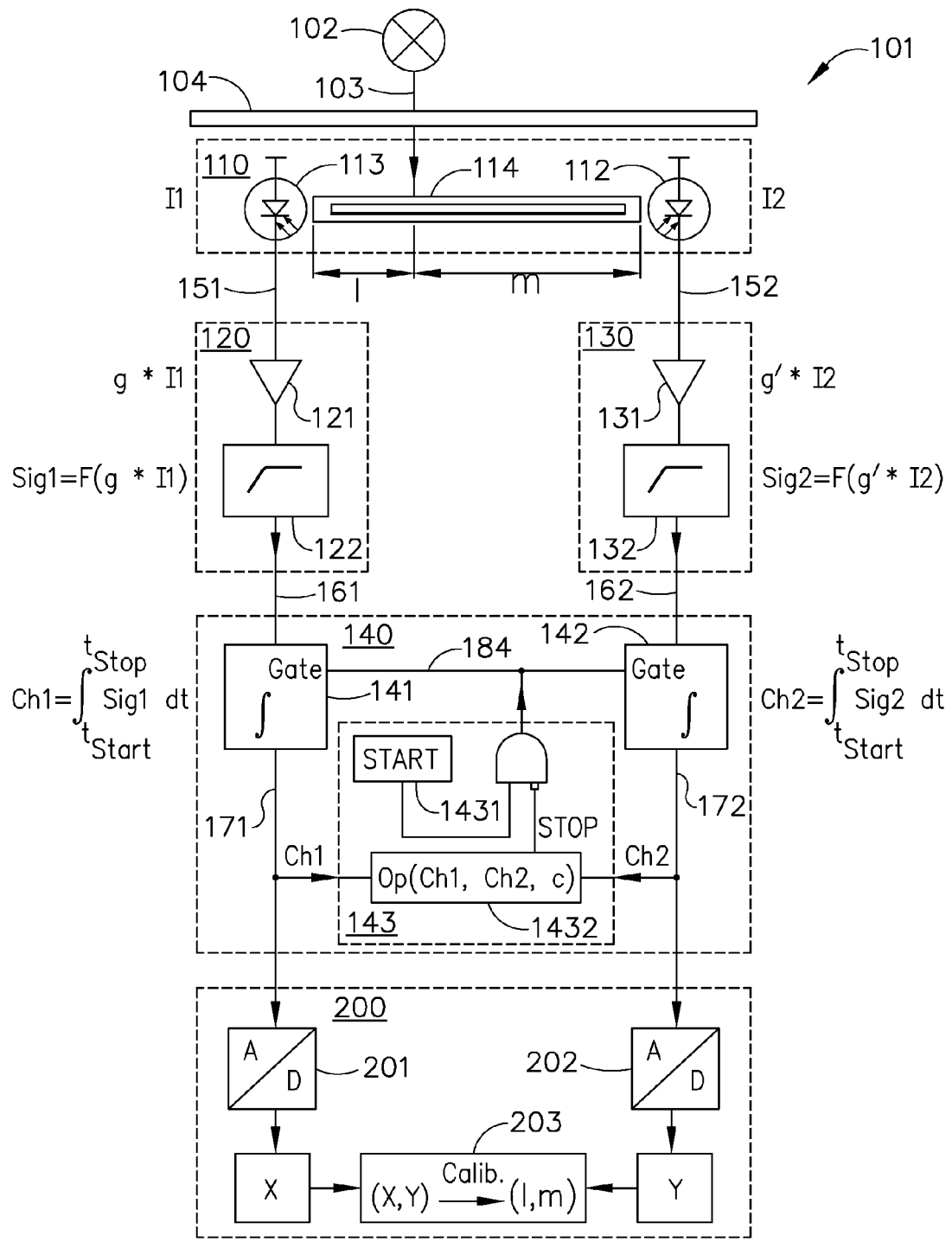
FIG. 4 is a block diagram of a light beam receiver according to a second embodiment of the technology disclosed herein; with the components of light beam detector element, amplifier, high pass filter, integrator, comparator with assigned integration time termination, analog-digital converter and evaluation component.

Referring now to FIG. 4, a second embodiment, generally denoted as a light beam receiver numeral 101, is provided for analyzing a reception of a light beam 103. Receiver 101 includes a light beam detector device 110, which in turn comprises several photodetector elements 112, 113, and integrators 141, 142 for light beam element-based signals. An optical filter 104 is provided, typically in the form of a window that covers the photosensors 112 and 113. Use of this optical filter 104 will be discussed below, in greater detail.

A signal integration time limiting control system 143 is provided, being assigned to at least two integrators (and therefore in this case both integrators 141, 142), so that the analysis of the light beam reception is made possible in response to two integrator output signals 171, 172. The signal 171 and 172 are evaluated in relation to each other, using a comparator evaluation/controller stage 200.

Figure 5:
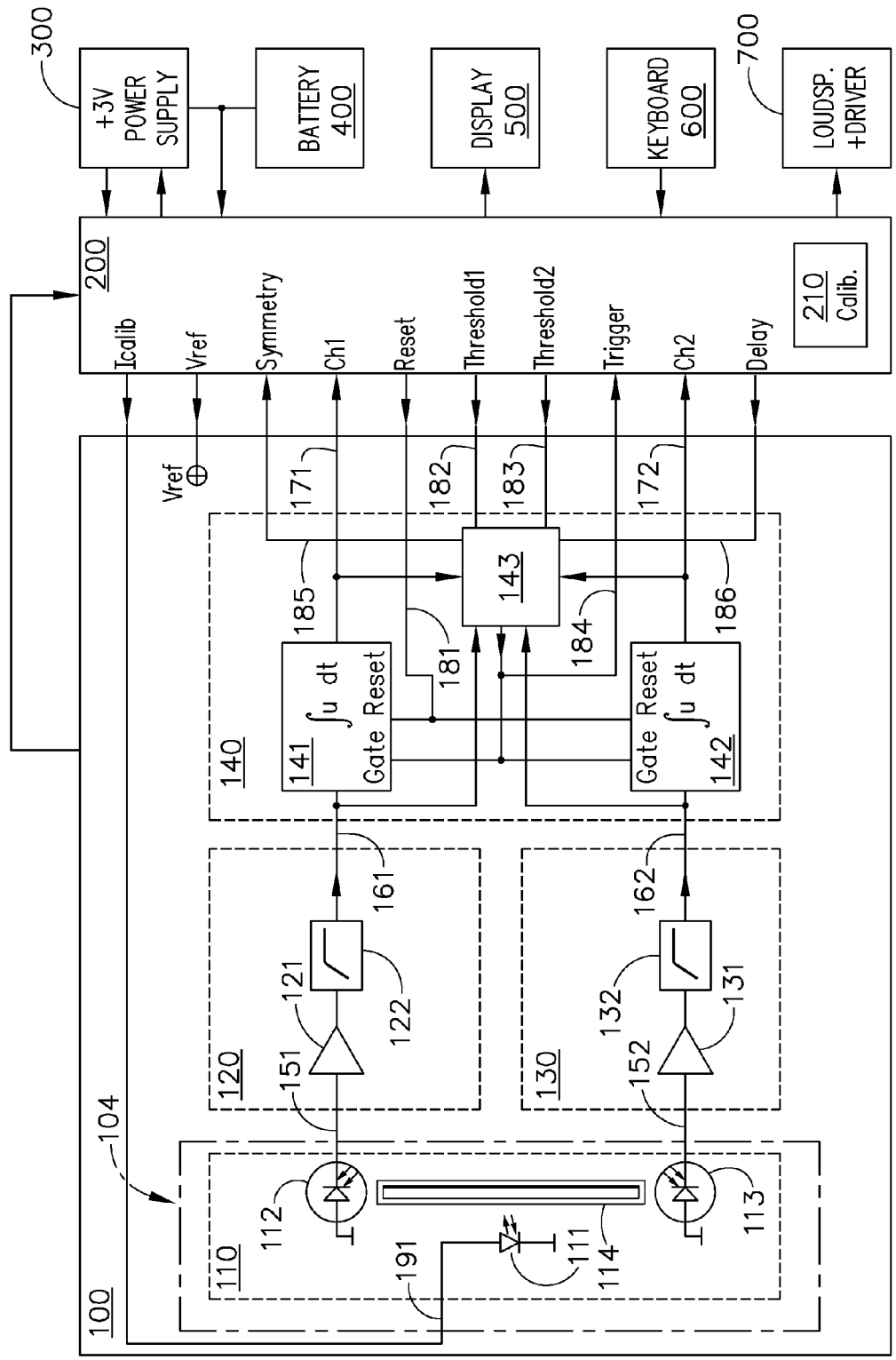
FIG. 5 is a block diagram of the light beam receiver of FIG. 4, provided with suitable peripheral components for display, operation and voltage supply, using digital components.

The light beam receiver 101 in FIG. 5 is in this example designed as a hand receiver and, accordingly, has a battery supply and local control elements, denoted in FIG. 5 by the reference numerals 300 (an energy source, such as a regulated DC power supply), 400 (a battery), 500 (a display), 600 (an input keypad or keyboard), and 700 (a signaling unit with a driver circuit). The keypad 600 can be used to enter input data to the processing circuit 200, and its individual keys are examples of user-actuated control input devices. Signaling unit 700 may comprise, for example, a speaker or other type of audible sound-producing element, and is designed for signaling beam incidence that is central, too high or too low, by use, for example, of tone modulation and pitch variation. The receiver 101 also includes a calibration data memory 210 that communicates with the comparator/system controller stage 200.

A calibration unit is assigned in the exemplary embodiment to the light beam receiver, which is designed according to FIG. 5 with a light emitting diode 111, which is supplied with power by a signal 191 from the evaluation and control unit 200. The LED 111 is designed and arranged to emit light in a known position between detector elements 112, 113, so that essentially the same proportions of light are received by both detector elements, so that time-based or temperature-based variations may be produced on the relevant detectors 112, 113.

The light beam emitting source 102 is shown in FIG. 4 as a bulb in the drawing, purely for easier recognition, but generally it will emit a sharply defined light beam and, in particular, it will be generated by a laser, typically a rotary laser, as is normal practice on construction sites. Such rotary lasers may have different designs. It is pointed out, in particular, use can be made of rotary lasers such as those described in PCT/EP 01/08841. The receiver 101 may easily be designed for evaluating the beams emitted shortly one after the other in such laser transmitters; in particular integration times, delays etc. may be determined separately for each beam, and/or the same delays, amplifications, etc. may be used, for simplification, for all beams which reach the receiver grouped closely one behind the other.

In this light receiver 101, the light beam 103 will impact a light conducting rod 114, where light will reach light detectors 112, 113 fastened to the end faces of a light-conducting rod 114 from the point of incidence, due to internal total reflection and propagation. The intensity of the light proportions reaching light beam detector elements 112, 113 depends here on how close to light beam detector elements 112, 113 the light beam 103 strikes light conducting rod 114. In the exemplary embodiment shown, light beam 103 strikes light conducting rod 114 closer to light beam detector element 113 than to light beam detector element 112. This can be seen on the different sections "l" and "m", which run from the point of incidence to the relevant front face.

It will be understood that the optical filters 99 and 104 of the first and second embodiments do not necessarily have to be mounted as "windows" over the photosensors, as depicted in the drawings. Instead, in the second embodiment for example, the location(s) of the optical filter 104 could be in two separate locations between the rod sensor 114 and the photodiodes 112 and 113; or the optical filter could be incorporated into the rod 114 itself, either as part of the rod's coating, or the rod material could be of a particular type of plastic that exhibits the proper spectral transmittance characteristics; or alternatively, the optical filter(s) could be incorporated into the coating and/or encapsulation material of the photodiode packages.

In the exemplary embodiment shown, it is assumed that the intensity of the light received on the light beam detector element is a measure of the distance of the point of incidence of light beam 103 on the light conducting rod 114 from the relevant end faces. It is not absolutely essential to have a linear relationship between the light intensity on the light beam detector elements and the proportion of the point of incidence to the length of the rod. However, for the purpose of this explanation this may easily be assumed, even if, in the case of highly absorbent rods, for example, absorption effects may be produced over the running length of any exponential attenuation, or if there may be a deviation from linearity for other reasons. However, it should be mentioned that such cases can generally be detected by a suitable evaluation or calibration. If necessary, several calibration sources, corresponding to light emitting diode 111 or the like, may be used to determine non-linearities.

Light beam detector elements 112, 113 are arranged on the end faces of light emitting rod 114 so that they receive light coupled into the rod 114, and are able to convert that light into electrical signals. In the exemplary embodiment shown, the photodetector elements 112 and 113 are light-sensitive photodiodes, for example. The signals denoted as I1 and I2 in FIG. 4, which correspond to output signals 151 and 152, produced respectively by light beam detector elements 112 and 113, are then conditioned by interface stages 120 and 130. Signals 151 and 152 are first amplified by amplification stages 121, 131 and, if necessary, impedance converted; those signals are then passed through filters 122, 132, which in the exemplary embodiment shown, are formed as high pass filters. The filters 122 and 132 are suitable for filtering out light fluctuations due to the AC frequency of artificial lighting, and for detecting only the higher frequency signal components of a rotary laser rotating at sufficient speed.

The conditioned and filtered signals 161 and 162, also denoted on FIG. 4 as Sig1 and Sig2, are then fed to an integrator stage 140, which includes integrators 141, 142, in order to integrate the signal intensity over time. Such integration circuits are well known. The integrators are in this case controllable, such that the starting time at which the integration commences, and the time of terminating the integration may be predetermined (i.e., controlled) from outside. In a simple variant the start time is selected depending on the rising edge, so that integration does not commence until a certain threshold value is reached. This prevents noise of varying volume on both channels, which would be included in the considerations for a prolonged period, from resulting in major signal falsifications. In one alternative variant, the start time could be delayed relative to the edge rise. The photosensors at 110, the filter stages 120, 130, and the integrator stage 140 are all part of the input interface circuit 100 of laser receiver 101.

In order to limit the integration time, an integration time termination value is assigned to the integrator stage 140, which contains integrators 141, 142, among other things. In the exemplary embodiment illustrated this takes place by feeding the corresponding integrated analog signals 171, 172 into a comparator 1432, which determines whether one of the integral values (171 or 172) has reached or exceed a certain threshold value "c". It should be mentioned that an alternative interruption condition, for example, could also be whether a function such as the sum of both integrator signals has reached threshold "c". As soon as such an excess is established, a stop signal is emitted to prevent further upward integration. If the stop signal is active, gate signal 184 of the integrators is deactivated. This can be achieved, for example, by opening a switch element that is to be integrated and allows signals to pass. This admission (or gate) circuit has the effect that when the signal strength approaches "c" in one of the channels (in this case channel 1, because a stronger signal is present there in terms of the relation 1<m), while in the other channel an integrator signal is received which is considerably smaller than "c".

The values for "c" are set by output signals 182 and 183 produced by the comparator evaluation/controller stage 200. Signals 182, 183 are also referred to on the drawings as "Threshold1" and "Threshold2" signals. In more detail, if the comparator evaluation/controller stage 200 comprises a microprocessor or microcontroller, then some type of digital-to-analog converter will be used to change a digital value representative of the threshold signal. On FIG. 6, such a D/A converter is depicted at reference numeral 501, and its output signal is used as the Threshold1 signal 182, which is directed to the comparator stage 1431.

One important use of the D/A converter 501 is for allowing the operating sensitivity of the laser receiver 101 to be altered by a user, using digital values and using a display that is easily readable by a user. Display 500 can be viewed by a user to determine the current operating sensitivity state of laser receiver 101, which is represented on FIG. 6 by a variable threshold setting circuit 502; the user is then able to change that sensitivity state by entering keystrokes on the keypad/keyboard 600. (This operating sensitivity state may also be referred to as a "gain state" of the interface circuit 100 of the first embodiment 101.)

As in the first embodiment 50, the signals that drive display 500 could, alternatively, be used to directly control a machine, in a "machine control" mode of operation. In that machine control mode, such signals could be signal conditioned as necessary to properly drive the circuits of the machine. Moreover, in such a machine control mode, a display may not be required on the laser receiver 101.

Once the user has made a change to the operating sensitivity state, a new value will be sent from setting circuit 502 to D/A converter 501, which will then change the analog voltage at signal 182. This effectively alters the threshold values to be then used by the comparator stage 1431, and accordingly, alters the operating range of the laser receiver 101. At the same time, this will alter the amount of "interference" rejection capability of laser receiver 101, which is a needed function because of possible interfering light sources, such as fluorescent lights and strobe lights, that might be present on the construction jobsite. The greater the interference rejection capability of the laser receiver, the greater its ability to distinguish the received pulses of laser light from an unwanted interference light signal produced by other light sources (such as, e.g., fluorescent lights and strobe lights).

By use of the operating sensitivity state control functions described above, it can be seen that the combination of the processing circuit 200 and the variable threshold setting circuit 502 act as a variable sensitivity control circuit for the laser light receiver 101. It will be understood that the greater the operating sensitivity parameter (that is set by the present gain state), the lower the rejection rate of unwanted interference light signals by the laser light receiver 101. If the operating sensitivity is set too high, then the laser light receiver will become too sensitive and will not sufficiently reject the unwanted interference light signals produced by interference (or "stray") light sources. On the other hand, if the operating sensitivity is set correctly, then the laser light receiver is able to effectively reject the unwanted interference light signals while still sufficiently receiving laser light from a desired source, such as a rotating laser transmitter that outputs a laser light plane which impacts the receiver as a series of laser light pulses.

It should be mentioned that, in addition to pure threshold control for the limitation of integration time, a timer-controlled integration time limitation may be provided alternatively and/or additionally. This can prevent signals from being processed even though only an extremely weak signal is received or the integration is started by random light incidence, signal noise or similar, but no relevant signal is actually present. In the case of additional integration time control, provision may also be made, alternatively and/or additionally, for integration to take place through several signal passages for repetitively received light beams, as is the case with rotary lasers. The advantage of this is that acceptable accuracies are still possible in terms of elevation determination, even over very long distances. For this purpose synchronization to a beam may be provided, for example, with a signal fed into the integrators only for a certain admission time during the expected signal passage. This allows a quasi lock-in behavior.

Suitable analog-digital converters 201, 202, which convert the integrated signal values 171 and 172 to corresponding digital values, are connected in series to the integrators in the example embodiment shown in FIG. 4. These A/D converters are part of the comparator evaluation/controller stage 200. The corresponding digital values are denoted by X and Y in FIG. 4, and it will be seen from the above that in this example X is approximately "c", while Y may be smaller. In order to determine the position of point of incidence 102 on light conducting rod 114 from the values X, Y obtained on the analog-digital converters, evaluation stage 200 comprises a calculation unit 203, which evaluation stage is in this case formed by a general mathematical operation, for example. This may, for example, be a divisor stage, but it may also be formed by a difference stage with suitable standardization, i.e., calculating a value according to $(X-Y)/(X+Y)$, for example. The latter variant has the particular advantage that independent signal amplitude values are still received for very weak signals on both channels. Moreover, in order to remove production or design conditioned linearity errors from the measured values, the calculation unit 203 may also take into account correction values from a calibration data memory 210. At the time of production these values are determined in a calibration device, then stored in calibration data memory 210.

The arrangement described is used as follows:

First a rotary laser 102 is put into operation, i.e., is caused to emit a laser beam sweeping a surface that lies as exactly horizontal as possible. When the rotation has stabilized, laser light receiver 101 is brought into the beam plane. Laser light beam 103 now repeatedly hits a point on light conducting rod 114 that is indicative of the position of light conducting rod 114 relative to the horizontal plane swept by the laser beam. The incidence of light on light conducting rod 114 results in pulse-type signals on the light beam detector elements 112, 113 situated on the rod's end faces, which elements are applied to integrator stage 140 after amplification and frequency response conditioning in the filter stages 120 and 130. The conditioned signals 161 and 162 are in this case admitted into both integrator channels for the first time as soon as a certain signal strength is exceeded in one of the two channels. If this is the case for only one channel, then not only the one but also the other channel is actively switched.

The signals of both channels are now integrated until a certain threshold value "c" is exceeded at the integrator output of a channel, which is established in comparator stage 1432. After this threshold is exceeded, it is established in stage 143 that the integration must be terminated and the input signal on both integrators correspondingly interrupted. Integrator outputs 171, 172 are then routed to analog-digital converters 201, 202, and corresponding digital values X, Y are determined. This can be achieved at a low sample rate since the signal is present for a relatively long time. At the same time the accuracy of the analog-digital conversion can be increased without great expense.

After the analog-digital conversion the integrator unit 140 can be reset using a signal 181 to enable the next passage to begin from an initial value of 0. The values X, Y obtained on the analog-digital converters are then determined in calculation unit 203, and an indication value corresponding to the calculated value is emitted (using the display 500). This value may be indicative of the distance of the light beam detector center from the elevation swept by the light beam, or may indicate whether the center lies exactly on the swept plane.

Figure 6:
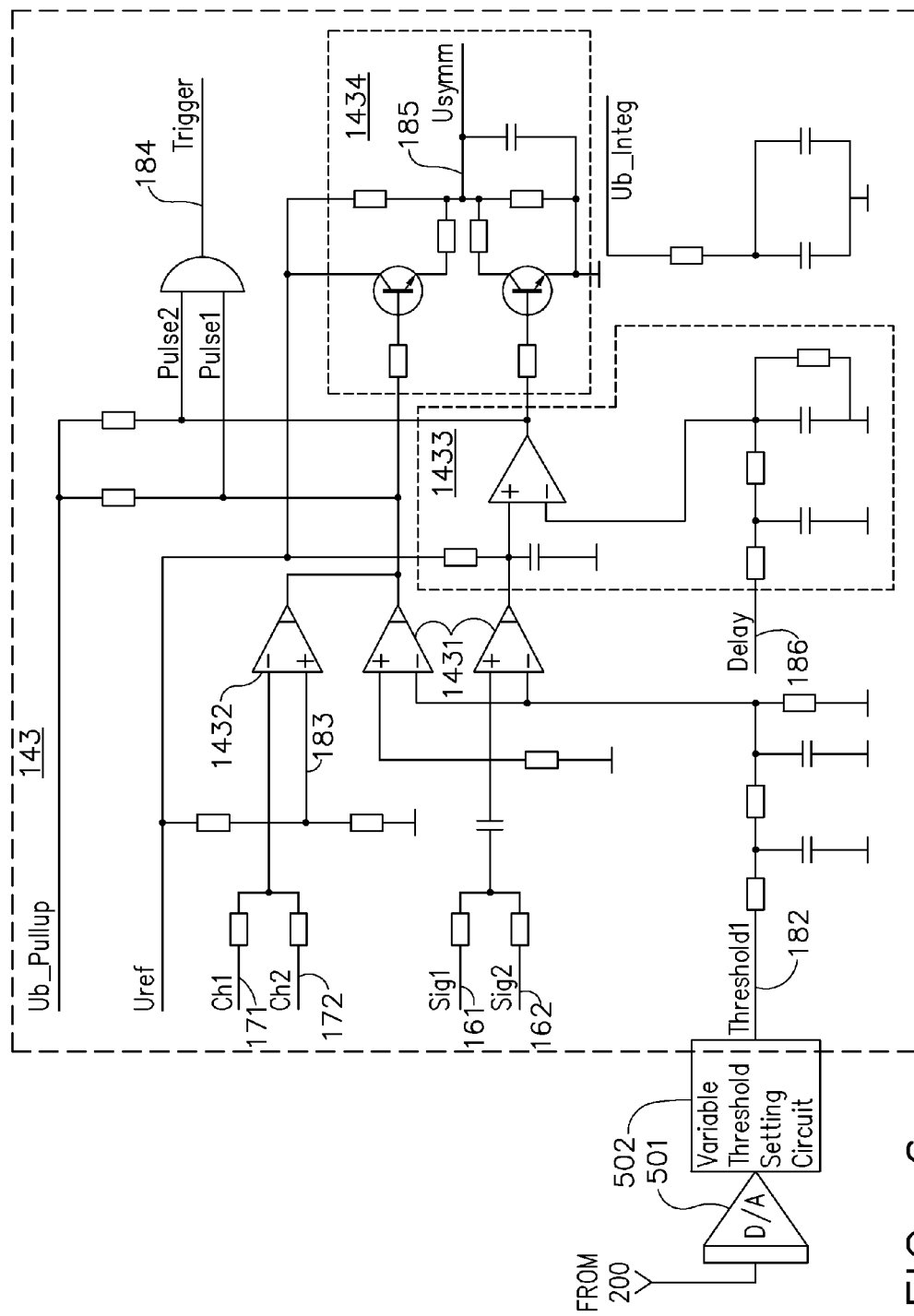
FIG. 6 is an electrical schematic diagram showing details of block 143 from FIG. 5, which comprises an integration start and stop circuit.

It is pointed out that details of the individual signal conditioning stage described only in block diagram form on FIG. 4 may be deduced from FIGS. 5 and 6. It is, moreover, not absolutely necessary to carry out signal filtering with bandwidth reduction. Nor is it necessary to choose integrated comparators for the triggering circuit, even though the use of integrated components is preferred.

Details of a possible design of the triggering circuit are shown in FIG. 6, but the peculiar feature here is that the comparators 1431, 1432 shown are represented as comparators with open collector outputs.

In FIG. 6 a time delay is effected by means of a monostable flip-flop 1433 that can be programmed by a control voltage 186 of evaluation unit 200. The integration time control system 143 generates here, by means of a simple time measuring circuit 1434, a voltage 185, the value of which indicates the position of integration time Δtint within beam passage time Δtpulse. The evaluation unit then uses this voltage to generate a new control voltage 186 for the next event.

Further details of the basic principles of operation of the second embodiment are available in Published Patent Application US 2009/0046269 A1, which is titled "LIGHT BEAM RECEIVER." This patent application was filed on Apr. 27, 2007, and assigned Ser. No. 11/666,596, and is incorporated herein by reference in its entirety.

Figure 7:
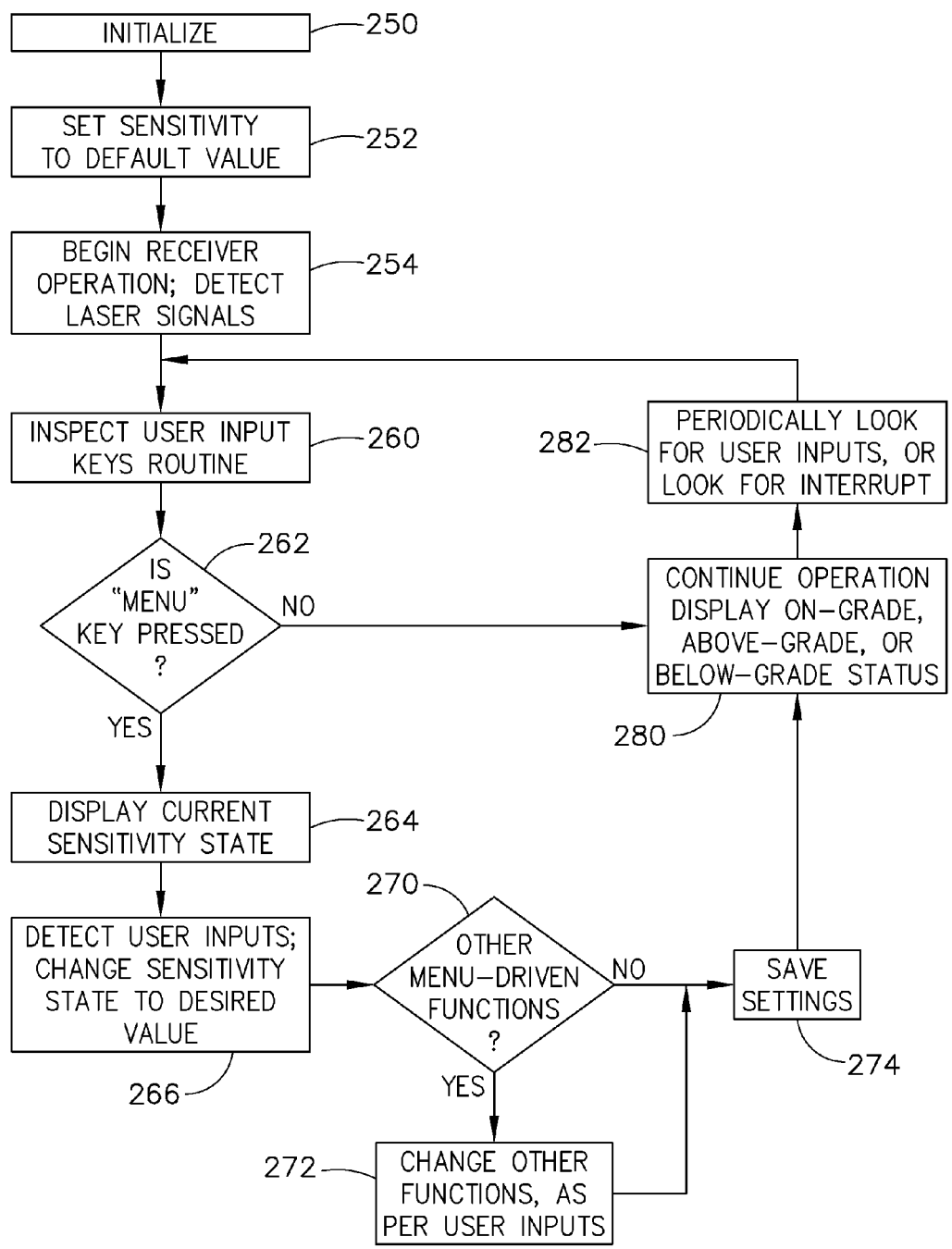
FIG. 7 is a flow chart of the operational steps performed by a laser receiver such as that of the second embodiment, depicted in FIGS. 4-6.

Referring now to FIG. 7, an operational flow chart is depicted which describes some of the major steps that are performed by the second preferred embodiment 101 as the laser receiver operates. Starting with an initialization step 250, the next step at 252 sets the operational sensitivity to its default value. In the second embodiment 101, the receiver's sensitivity is manually adjustable by the user, and in one mode of the second embodiment, there are four different sensitivity states. The four sensitivity states are referred to as: "Low", "Medium", "High", and "Very High".

In a preferred mode of operation, the default value for the sensitivity is set to "Medium" at step 252 of the flow chart depicted on FIG. 7. The user will later be able to change the sensitivity state, as described below.

The receiver's operation now arrives at a step 254 in which the receiver begins to detect laser signals that impact its photosensors. As this function begins to operate, the receiver also inspects the status of the input keys on the key pad 600 of the receiver 101. This occurs at a step 260, which begins a routine to inspect the user input keys.

The operational flow now arrives at a decision step 262 which determines if the "MENU" key has been pressed. If the answer is YES, then the logic flow is directed to a step 264 in which the current sensitivity state is displayed on the display 500 of the receiver. If the receiver had just been turned on, then the default sensitivity state would be displayed as the word "Medium". Of course, the second embodiment laser receiver could have a different default state, if desired, as determined by the system designer. In that situation, the current sensitivity state would come up with a different value, other than "Medium".

The decision step 262 used a keystroke called "MENU" as the determining factor in deciding whether or not the user was attempting to change the sensitivity state of the receiver. It will be understood that other types of key presses (or keystrokes), including a combination of more than simultaneous one key press, could be used to cause the display 500 to show the current sensitivity state and to enter a mode where that sensitivity state could be altered by the user. This type of design choice would certainly be affected by the types of keys that are made available on the key pad/key board 600 of the laser receiver 101. A "full" numeric key pad is not necessary for most laser receiver devices, and only an abbreviated set of function keys would be viable for such devices in most situations. The operation of those keys would be made known to the user, either by the symbols on the keys themselves, or by a user's manual that is provided with the receiver unit 101.

The logic flow has now reached a step 266, in which the second embodiment receiver 101 will detect the user inputs and change the sensitivity state to the desired value. In the second preferred embodiment, there are four different sensitivity states, and the user may wish to increase the sensitivity to either the "High" state or the "Very High" state. If the user does increase the sensitivity of the receiver unit 101, the user may find that this increased sensitivity value might be too great for the environment that the unit 101 is operating in. In that circumstance, the user will likely wish to lower the sensitivity state of the unit, by again going through the MENU key press routine that starts at step 260 on FIG. 7. The effects of the various sensitivity steps will be discussed below in greater detail.

As the user changes the sensitivity state at step 266, the display 500 will show the current value of the sensitivity state that has been now selected by the user. Once the user has finished changing the receiver's operating sensitivity state, the logic flow is directed to a decision step 270, in which the receiver 101 determines whether or not other MENU-driven functions are now being entered by the user. If the answer is YES, the logic flow is directed to a step 272 that changes other functions of the receiver, as per the user's keypad inputs. Once that has occurred, or if no other MENU-driven functions are being attempted at step 270, the logic flow is directed to a step 274 in which the receiver 101 saves the most recent settings that were entered by the user.

The operational logic flow is now directed to a step 280, in which the receiver 101 continues its operation and displays the grade status of the receiver's current physical elevation with respect to laser light pulses that are being detected by its photosensors. This step 280 is also arrived at from decision step 262, if the answer was NO with respect to whether or not the "MENU" key was pressed. Typically at step 280, the laser receiver 101 will indicate on its display 500 whether or not the unit is on-grade, above-grade, or below-grade. This indication provides the user with a quick and accurate indication of the elevation of the laser receiver 101 with respect to the desired elevation that is indicated by the plane of laser light emitted from a rotating laser transmitter. This type of operation is well known by users of laser receivers on construction sites.

As the receiver 101 continues operation at step 280, the logic flow is directed to a step 282, in which the receiver periodically looks for additional user inputs, in an effort to determine if the user wishes to change one of the states of the receiver 101. This includes changing the sensitivity state of the receiver, and if that user input has occurred, the logic flow is directed back to the user input inspection routine that begins at step 260. If the user has not pressed the MENU key (or some other equivalent set of keystrokes), then the logic flow is directed back to step 280, in which the receiver continues its operation to display its current grade status. It will be understood that step 282 may not actually be a periodic task that occurs in sequential software, but instead this step 282 may be quickly entered into by use of an interrupt that could be generated by the key pad 600, if the control circuitry is designed to accommodate interrupt-driven functions.

Figure 8:
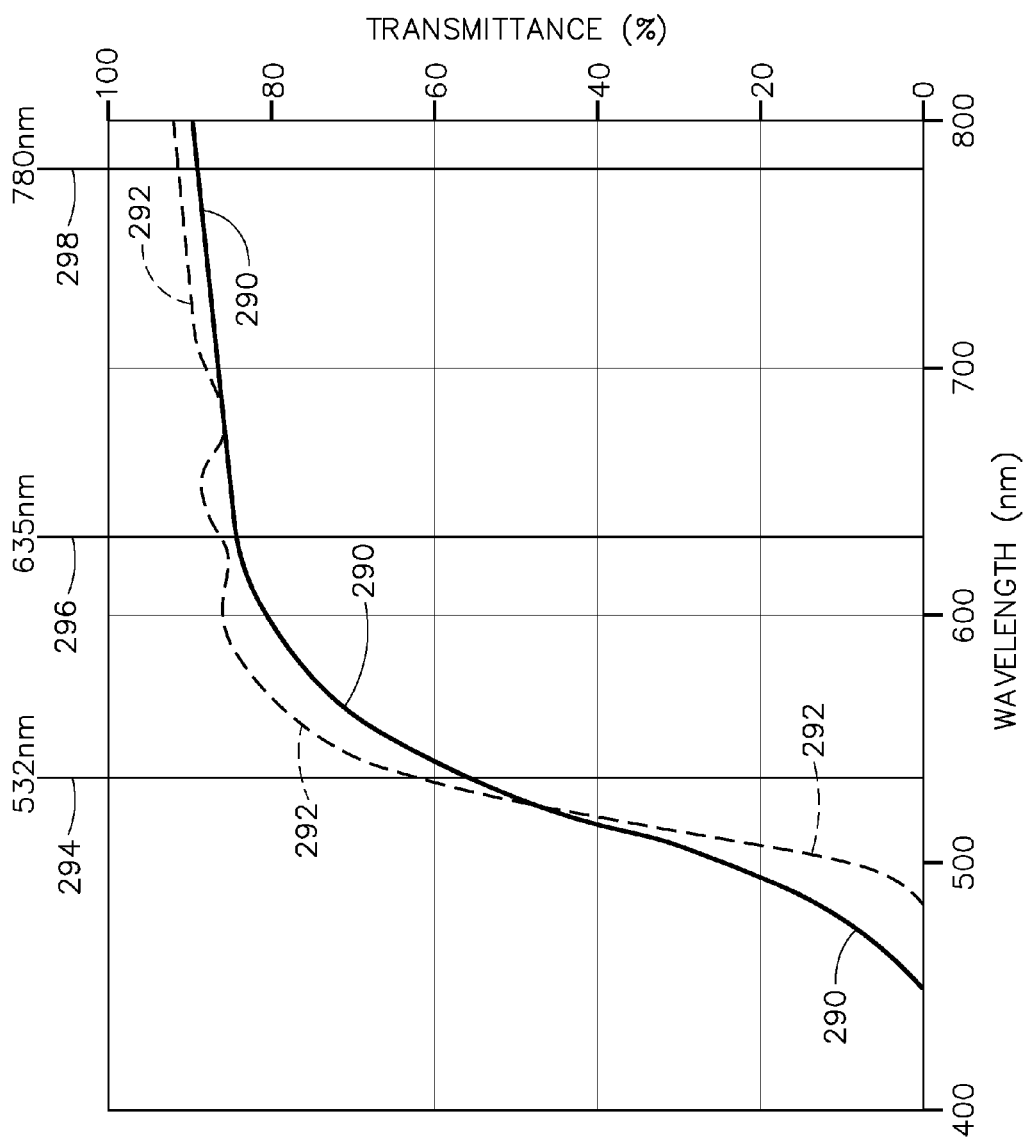
FIG. 8 is a graph showing the transmittance characteristics of two different optical filter materials over a range of wavelengths that span the visible light spectrum, and into the infrared region.

Referring now to FIG. 8, a graph of the transmittance characteristics of two different optical filter materials is provided over the wavelengths of visible light, and into the infrared spectrum. The curve that is depicted by reference numeral 292 represents the transmittance characteristics of an optical filter film material that is manufactured by Lee Filters USA, of Burbank, Calif. This filter is referred to by Lee as number 767, and its color is referred to as "Oklahoma Yellow."

The other curve on FIG. 8, at reference numeral 290, represents a window that is manufactured for laser receiver products sold by Trimble Navigation Limited, under the product family moniker Apache Technologies. As can be seen by inspecting FIG. 8, the curves 290 and 292 are very similar in their transmittance response versus wavelength characteristics, although the curve 290 has been optimized for Trimble's line of Apache Technology laser receivers.

FIG. 8 also indicates where the "main" laser transmitter wavelengths exist along the X-axis (i.e., the wavelength axis). The line 294 is for green laser light transmitters, more specifically those transmitting at 532 nm. The line 296 on FIG. 8 indicates a "main" wavelength for red light laser transmitters, more specifically those that emit light at the wavelength 635 nm. The line 298 indicates a "main" wavelength for infrared laser transmitters, more specifically those that emit infrared light at 780 nm.

As can also be seen by inspecting FIG. 8, the optical filter transmittance characteristics allow much more light to pass therethrough in the red and infrared spectra, as compared to the amount of green light that is allowed to pass therethrough at the 532 nm spectrum. This is, by design, partially to assist in inhibiting a response to fluorescent lights by the laser receiver. As discussed above in the BACKGROUND, laser receivers that are sensitive to green laser light sometimes have trouble rejecting fluorescent light frequencies, and therefore often give false indications. These false indications typically occur on jobsites that are inside buildings (rather than outdoors), particularly because there tends to be more fluorescent lighting that illuminates jobsites under construction for indoor environments. However, there are some advantages to using green laser transmitters even for indoor environments, so laser receivers that can detect green laser light are required in many situations.

On the other hand, laser receivers also need to take into consideration the saturation effect of sunlight for outdoor environments on construction sites. This typically can be a problem throughout all of the visible light wavelengths, and into the infrared spectrum. This problem is well-known in the industry, and essentially requires that a laser receiver not have a sensitivity that is too great.

With respect to sensitivity to fluorescent light sources, it is well-known that most fluorescent light sources produce visible light in the wavelength range between 500 and 600 nm. Additionally, some fluorescent lights have strong output peaks between 400 and 500 nm, and also some fluorescent light sources have strong peaks just above 600 nm. Therefore, the designer of a laser receiver needs to be concerned about the overall sensitivity to fluorescent light sources mainly in the wavelength ranges between 400 and just above 600 nm. Unfortunately, this range encompasses green light laser transmitters, which typically emit light around 530 to 540 nm. Therefore, the overall sensitivity of a laser receiver in the range of 400-600 nm must be selected with care.

The laser receiver of the technology disclosed herein need not necessarily be sensitive to both red and infrared laser light sources. In an alternative mode, the optical filter 99 (or 104) could be designed to be sufficiently transmissive to only visible green and visible red light (e.g., in the wavelengths around 532 nm and 625 nm), and not to be as transmissive in the infrared spectrum (e.g., in the wavelengths around 780 nm and greater). Or, in this alternative mode, the photosensors 94 (or 112, 113) could be designed with a frequency response so as to be sufficiently sensitive to only visible green and visible red light (e.g., in the wavelengths around 532 nm and 625 nm), and not to be as sensitive in the infrared spectrum (e.g., in the wavelengths around 780 nm and greater). Or a combination of optical filter transmittance and photosensor frequency response could achieve that effect, if desired. In this alternative mode, the combination of the optical filter transmittance curve and photosensor frequency response characteristics would roll off significantly between the red wavelength range of about 670 nm and the infrared wavelength range of about 780 nm.

The system designer of a laser receiver can determine its sensitivity states and their effects on the operating range detection capability of the laser receiver with respect to a particular light frequency, and also with respect to the power level of a particular laser transmitter device. For example, a laser receiver sold by Apache Technologies, under product number HL700, has been sold with the capability for the user to select three different sensitivity states, "High", "Medium", or "Low". The HL700 receiver is sensitive to both red and infrared laser light, but does not have any capability for detecting green laser light. This is indicated numerically in TABLE #1, presented below.

TABLE #1

| Sensitivity State | Laser Light Wavelength | Operating Range (in Feet) | |
|---|---|---|---|
| | | Receiver 101 | HL700 |
| VERY HIGH | 532 nm (green) | >1400 | — |
| HIGH | 532 nm (green) | 925 | 0 |
| MEDIUM | 532 nm (green) | 625 | 0 |
| LOW | 532 nm (green) | 575 | 0 |
| VERY HIGH | 635 nm (red) | 1175 | — |
| HIGH | 635 nm (red) | 825 | 1175 |
| MEDIUM | 635 nm (red) | 600 | 1000 |
| LOW | 635 nm (red) | 525 | 600 |
| VERY HIGH | 780 nm (infrared) | >1400 | — |
| HIGH | 780 nm (infrared) | 1075 | >1400 |
| MEDIUM | 780 nm (infrared) | 700 | 1350 |
| LOW | 780 nm (infrared) | 600 | 800 |

As can be seen by inspecting Table #1, the HL700 has a zero operating range for green wavelengths (specifically at 532 nm), but has very good operating range capabilities in the red and infrared spectra. More specifically, the ranges listed in Table #1 for the HL700 are with respect to a Trimble Laser Transmitter Model #EL1, which is an infrared laser transmitter that emits light at 780 nm. Additionally, the operating range statistics for the red laser light in Table #1 are with respect to an Agatek Model #A410S, which is a red laser transmitter that emits laser light at 635 nm.

Table #1 also provides example operating range characteristics for the second embodiment receiver 101, which not only is capable of detecting red and infrared light, but also can detect green laser light, all in one unitary device. The range statistical information for red and infrared are again with respect to the Trimble Model #EL1 infrared transmitter and the Agatek Model #A410S red light transmitter. For the green-light characteristics, a Trimble Model #HV310G was used to test the receiver 101 of the second embodiment. The Trimble Model #HV310G transmitter emits green laser light at 532 nm.

It will be understood that the operating range performance data provided in Table #1 have been selected by the receiver's designer, and these could be altered to either increase or decrease the operating range, if desired. Of course, if the operating range is increased then the laser receiver may exhibit additional false readings due to interference light sources, such as fluorescent lights or strobe lights, particularly in the green wavelengths. Furthermore, if the range characteristics are increased too greatly, then the photosensors may be more prone to saturation due to sunlight for outdoor jobsites. The operating ranges listed in Table #1 for the second embodiment receiver 101 provide a good tradeoff between operating range capability and fluorescent light rejection characteristics.

Another consideration that should be understood with respect to the receiver 101 of the second embodiment is that the operating ranges for the red and infrared wavelengths correspond to a predetermined set of fluorescent light rejection characteristics that are compatible with the earlier model HL700 laser receiver sold by Apache Technologies/Trimble Navigation. In other words, the fluorescent light rejection capability of the HL700 for the red and infrared wavelengths is the same as the fluorescent rejection characteristics of the receiver 101 (which is the second embodiment) for the same sensitivity states and wavelengths of received light. For example, in the red laser light wavelength at 635 nm, if the Low sensitivity state is selected, then the model HL700 has a operating range of 600 feet while the receiver 101 has a operating range of 525 feet. These two range characteristics for the two different laser receivers are both based on the same value for fluorescent light rejection capability. If desired, the system designer could have selected an operating range of 600 feet for the low sensitivity state if desired, of the red 635 nm wavelength, but the fluorescent light rejection capability would also been decreased by about the same percentage. These operating ranges versus fluorescent light rejection capabilities are always adjustable as design values by a receiver's system designer, and are considered to be incorporated within the principles of the technology disclosed herein.

In essence, by design choice the operating range of the receiver 101 (the second embodiment) may be intentionally degraded somewhat, so that the fluorescent light rejection characteristics of the receiver 101 closely match the fluorescent light rejection characteristics of the previous model HL700, sold by Apache Technologies/Trimble Navigation. In this manner, if a user has become accustomed to using a model HL700 at a particular sensitivity state for a particular laser transmitter wavelength, then the new receiver 101 will operate in the same environment with the same fluorescent light rejection capabilities. While it is true that the operating range may be degraded to a certain extent, the user can always increase the sensitivity state to the next level to increase the operating range if desired. Of course, the user who increases the sensitivity state may find that the interference light sources cause too many false readings, and that problem might have to be overcome by reducing the sensitivity state after all.

As can be seen from Table #1, although the operating range has been reduced somewhat in the red and infrared spectra, the receiver 101 still has a wide operating range available for indoor jobsite activities. Furthermore, receiver 101 has an additional sensitivity state, i.e., "Very High", which allows an increased operating range capability that matches the highest sensitivity state of the earlier model HL700. This will be particularly useful for outdoor environments, and fluorescent light source interference would typically less of a problem for such outdoor environments. From that standpoint, the receiver 101 (i.e., the second embodiment) can be made to exhibit the same high-end operating range characteristics as the earlier HL700 receiver that has been sold by Apache Technologies/Trimble Navigation.

The first embodiment that is depicted on FIGS. 1-3 includes automatic gain control circuitry, as described above. Such automatic gain control circuitry has been available in an earlier model sold by Apache Technologies/Trimble Navigation, under the Model #HR150. Both units have automatic gain control, in which the operating range and sensitivity states are automatically adjusted in accordance with the amount of laser light power received at the photo sensors 94 of the laser receiver unit 50 (for the first embodiment), and therefore, both the laser receiver 50 of the first embodiment and the earlier model HR150 will have similar range characteristics and fluorescent light rejection capabilities, as desired by the system designer of the receiver unit. Again, a tradeoff can be made between the operating range and the fluorescent light frequencies rejection capabilities of the "old unit" HR150 and the "new unit" 50 of the first embodiment. For many user applications, it makes sense to provide a somewhat degraded range operating range capability so as to keep the fluorescent light rejection characteristics the same between the "new unit" and the "old unit."

One significant difference between the "old unit" model HR150 and the "new unit" laser receiver 50 (the first embodiment) is that laser receiver 50 is capable of detecting green laser light, whereas the model HR150 has virtually no capability at all for detecting green laser light. This allows the two embodiments to be considered as "universal receivers," from the standpoint that they can detect laser light wavelengths in all of the "normal" spectra, including green light, red light, and infrared light. With careful design, these "universal receivers" also have a good fluorescent light rejection capability.

The second embodiment 101 as described herein can be designed to exhibit certain performance parameters that can be compared to the existing laser receiver sold by Apache Technologies, under product number HL700. The overall performance parameter is the operating sensitivity of the laser receiver at various wavelengths of laser light. The operating sensitivity is related to the range (distance) at which the laser receiver can detect pulses of laser light from a laser transmitter. In these laser receivers, the operating sensitivity is dependent upon the optical window's transmittance characteristics, the "rod sensor's" transmission characteristics, and the photosensor's frequency response characteristics (also called the photodiode sensitivity factor). In this example, the optical window is equivalent to the optical filter 104; the rod sensor is element 114; and the photosensors are photodiode elements 112 and 113. In the discussion below, these three values are all normalized to a factor of 1.0 with respect to the existing Apache product number HL700 device.

The sensitivity equation can be expressed as:

$$S = W_T \times R_T \times PD, \text{ where:}$$

S is the overall operating sensitivity (or "relative response").
$W_T$ is the window transmittance characteristics factor.
$R_T$ is the rod sensor transmission factor.
PD is the photodiode sensitivity factor.

The tabular data below shows the HL700 device characteristics at three different laser light transmitter wavelengths:

| Wavelength | $W_T$ | $R_T$ | PD | S (overall relative response) |
|---|---|---|---|---|
| 780 nm | 1.00 | 1.00 | 1.00 | 1.00 |
| 635 nm | 0.99 | 0.89 | 0.64 | 0.64 |
| 532 nm | 0.02 | 0.84 | 0.36 | 0.006 |

The tabular data below shows the same performance parameters for the second embodiment 101, at the same three different laser light transmitter wavelengths:

| Wavelength | $W_T$ | $R_T$ | PD | S (overall relative response) |
|---|---|---|---|---|
| 780 nm | 1.07 | 1.00 | 1.00 | 1.07 |
| 635 nm | 1.00 | 0.89 | 0.64 | 0.57 |
| 532 nm | 0.68 | 0.84 | 0.36 | 0.20 |

As can be seen from the above performance data, the second embodiment 101 and the HL700 device exhibit similar overall operating sensitivity characteristics for infrared (at 780 nm) and visible red (at 635 nm) wavelengths of electromagnetic energy. At green (at 532 nm) wavelengths of electromagnetic energy, the second embodiment 101 is much more responsive, although its overall operating sensitivity is intentionally lower at green light than at infrared light or visible red light, by design. This improves its capability to reject unwanted fluorescent light. It will be understood that the above performance data has been presented merely as an exemplary way the technology disclosed herein could be utilized, and that such performance characteristics can easily be modified without departing from the principles of the technology disclosed herein.

The above performance data for the second embodiment 101 shows that its overall operating sensitivity for green light is only about 20% of its overall operating sensitivity for infrared light. As noted above, this is by design. However, it will be understood that the exact performance specifications of a laser light receiver can be somewhat altered from these above figures without departing from the principles of the technology disclosed herein. In an alternative mode, the laser light receiver could exhibit an overall operating sensitivity for green light that is in a range of about 10% to 50% of its overall operating sensitivity for infrared light. In yet another alternative mode, the laser light receiver could be even less sensitive to green light if a user is willing to sacrifice some operating range for certain indoor applications, and in this mode, the laser light receiver could exhibit an overall operating sensitivity for green light that is even less than 10%, as compared to its infrared light overall operating sensitivity.

In one embodiment of a laser light receiver, the spectral response characteristics involving the overall operating sensitivity can be essentially inverse to the spectral energy profile produced by fluorescent light sources. As noted above, fluorescent light sources tend to produce electromagnetic energy mainly in the range from 500 to 600 nm, with some strong peaks between 400 to 500 nm. The above performance data is one example of a laser receiver that is sufficiently sensitive at green light, red visible light, and infrared light wavelengths, but that also tends to reject fluorescent light energy.

In the construction technical field, there are many different laser transmitter models being sold today. The list below shows several model numbers of such transmitters, including the wavelength of the laser light that they output:

| Green Lasers: | |
|---|---|
| Trimble HV301G | 532 nm |
| CST ALHV-G | 535 nm |
| Leica Roteo 35G | 532 nm |
| Topcon RL-VH4G2 | 532 nm |
| Red Lasers: | |
| Trimble GL422 | 635 nm |
| Trimble GL522 | 635 nm |
| Trimble HV101 | 635 nm |
| Trimble HV401 | 635 nm |
| Agatek A410S | 635 nm |
| Topcon RL-VH4DR | 635 nm |
| Leica Rugby 100 | 635 nm |
| Trimble LL400 | 650-658 nm |
| Trimble GL412 | 650 nm |
| Trimble GL512 | 650 nm |
| Trimble GL7XX | 658 nm |
| Trimble LL100 | 650 nm |
| Trimble LL300 | 635-670 nm |
| Trimble LL500 | 670 nm |
| Laser Ref. Vertex | 650-670 nm |
| Agatek GAT120 | 670 nm |
| InfraRed Lasers: | |
| Trimble EL1 | 780 nm |
| Trimble GL7XX | 785 nm |
| Leica Rugby 100LR | 780 nm |

In summary, with this new approach for a more universal laser receiver, an optical filter that allows a wider range of light to pass is employed. To offset the "stray-signal" problems typically associated with using such a filter, the laser receiver could have a variety of user-selectable thresholds settings (minimum levels at which the electronics are triggered) made available from which the customer could choose an appropriate sensitivity setting to work within the unique conditions of a given job site. For instance, if someone were trying to work in an area with many fluorescent light (such as indoors, and probably operating at relatively short ranges between the receiver and transmitter), the detection threshold could be increased (thereby reducing the sensitivity of the unit) to a sufficient level where the receiver unit can still detect the laser at a reasonable operating range, but not respond to the fluorescent light. On the other extreme, if a user were to be working outside (away from fluorescent lights) and also needing to detect the laser at relatively long distances, a lower threshold setting (thus with higher sensitivity) could be selected at a point where the receiver unit could detect the laser light at the longer distance, while still not being inadvertently triggered by sunlight.

It will be understood that the logical operations described in relation to the flow chart of FIG. 7 can be implemented using sequential logic (such as by using microprocessor technology), or by using a logic state machine, or perhaps by discrete logic; it even could be implemented using parallel processors. One preferred embodiment may use a microprocessor or microcontroller (e.g., microprocessor 78) to execute software instructions that are stored in memory cells within an ASIC. In fact, the entire microprocessor 78, along with RAM and executable ROM, may be contained within a single ASIC, in one mode. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the calibration data stored, for example, in memory element 210), or perhaps by a type of memory device not yet invented.

It will be further understood that the precise logical operations depicted in the flow chart of FIG. 7, and discussed above, could be somewhat modified to perform similar, although not exact, functions without departing from the principles of the technology disclosed herein. The exact nature of some of the decision steps and other commands in these flow charts are directed toward specific future models of laser receivers (those involving Trimble or Apache laser receivers, for example) and certainly similar, but somewhat different, steps would be taken for use with other models or brands of laser receivers in many instances, with the overall inventive results being the same.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A laser light receiver, comprising:
a processing circuit, at least one photosensor, a variable sensitivity control circuit, an output circuit, and at least one optical filter;
wherein:
(a) said at least one optical filter exhibits an optical characteristic so as to allow only wavelengths of electromagnetic energy at predetermined transmittance characteristics to pass therethrough to impact upon said at least one photosensor, such that said predetermined transmittance characteristics sufficiently pass wavelengths in both the green and red visible light ranges;
(b) said at least one photosensor exhibits a predetermined frequency sensitivity characteristic so as to be sufficiently sensitive to electromagnetic energy in both the green and red visible light ranges; and said at least one photosensor, after receiving a sufficient amount of electromagnetic energy that impacts thereon, outputs at least one first signal to said variable sensitivity control circuit, which modifies said at least one first signal according to a gain state of said variable sensitivity control circuit to produce at least one second signal, and outputs said at least one second signal to said processing circuit; and
(c) said laser light receiver is configured:
  (i) to evaluate said at least one second signal and, based upon a value of said at least one second signal, to determine a relative elevation of said at least one photosensor with respect to received electromagnetic energy that impacts thereon, and, using said output circuit, to output a third signal to provide an indication of said determined relative elevation; and
  (ii) to effectively reject an unwanted interference light signal that may be included in said at least one second signal, by inhibiting an output of said third signal by said output circuit and thereby preventing an indication of said determined relative elevation due to such unwanted interference light signal;
wherein:
said laser light receiver is further configured to determine said gain state of the variable sensitivity circuit, and to output said third signal for indicating said relative elevation based on that determined gain state; and
said laser light receiver is further configured to effectively reject the unwanted interference light signal at a rejection rate that is determined by said gain state.

2. A laser light receiver, comprising:
a processing circuit, at least one photosensor, a variable sensitivity control circuit, an output circuit, at least one optical filter; and at least one user-actuated control input device;
wherein:
(a) said at least one optical filter exhibits an optical characteristic so as to allow only wavelengths of electromagnetic energy at predetermined transmittance characteristics to pass therethrough to impact upon said at least one photosensor, such that said predetermined transmittance characteristics sufficiently pass wavelengths in both the green and red visible light ranges;
(b) said at least one photosensor exhibits a predetermined frequency sensitivity characteristic so as to be sufficiently sensitive to electromagnetic energy in both the green and red visible light ranges; and said at least one photosensor, after receiving a sufficient amount of electromagnetic energy that impacts thereon, outputs at least one first signal to said variable sensitivity control circuit, which modifies said at least one first signal according to a gain state of said variable sensitivity control circuit to produce at least one second signal, and outputs said at least one second signal to said processing circuit; and (c) said laser light receiver is configured:

(i) to evaluate said at least one second signal and, based upon a value of said at least one second signal, to determine a relative elevation of said at least one photosensor with respect to received electromagnetic energy that impacts thereon, and, using said output circuit, to output a third signal to provide an indication of said determined relative elevation; and (ii) to effectively reject an unwanted interference light signal that may be included in said at least one second signal, by inhibiting an output of said third signal by said output circuit and thereby preventing an indication of said determined relative elevation due to such unwanted interference light signal;

wherein:

(a) said laser light receiver is further configured to determine said gain state of the variable sensitivity circuit, and to output said third signal for indicating said relative elevation based on that determined gain state;

(b) said laser light receiver is further configured to determine if said at least one user-actuated control input device has been activated, and if so, to perform a function that configures said laser light receiver into an operating mode that is predetermined by input data that was entered by said at least one user-actuated control input device; and (c) said gain state of the variable sensitivity circuit is manually controlled by said operating mode that was entered by said at least one user-actuated control input device, as said input data.

3. The laser light receiver of claim 2, wherein a user, who enters said input data on said at least one user-actuated control input device, determines a desired value for said gain state by selecting a first operating range for said laser light receiver that is essentially too sensitive and does not sufficiently reject said unwanted interference light signal, and then selecting a second, different operating range that is somewhat less sensitive such that said laser light receiver does sufficiently reject said unwanted interference light signal.

4. A laser light receiver, comprising:

a processing circuit, at least one photosensor, a variable sensitivity control circuit, an output circuit, at least one optical filter; and at least one user-actuated control input device;

wherein:

(a) said at least one optical filter exhibits an optical characteristic so as to allow only wavelengths of electromagnetic energy at predetermined transmittance characteristics to pass therethrough to impact upon said at least one photosensor, such that said predetermined transmittance characteristics sufficiently pass wavelengths in both the green and red visible light ranges;

(b) said at least one photosensor exhibits a predetermined frequency sensitivity characteristic so as to be sufficiently sensitive to electromagnetic energy in both the green and red visible light ranges; and said at least one photosensor, after receiving a sufficient amount of electromagnetic energy that impacts thereon, outputs at least one first signal to said variable sensitivity control circuit, which modifies said at least one first signal according to a gain state of said variable sensitivity control circuit to produce at least one second signal, and outputs said at least one second signal to said processing circuit; and (c) said laser light receiver is configured:

(i) to evaluate said at least one second signal and, based upon a value of said at least one second signal, to determine a relative elevation of said at least one photosensor with respect to received electromagnetic energy that impacts thereon, and, using said output circuit, to output a third signal to provide an indication of said determined relative elevation; and (ii) to effectively reject an unwanted interference light signal that may be included in said at least one second signal, by inhibiting an output of said third signal by said output circuit and thereby preventing an indication of said determined relative elevation due to such unwanted interference light signal;

wherein:

said laser light receiver is further configured to determine said gain state of the variable sensitivity circuit, and to output said third signal for indicating said relative elevation based on that determined gain state; and wherein said variable sensitivity control circuit comprises an automatic gain control circuit, which:

(d) initializes said gain state to a first predetermined gain state value and, outputs said at least one second signal to said processing circuit while operating in said first predetermined gain state value;

(e) then, based on a gain control signal that is output from said processing circuit to said automatic gain control circuit, iteratively modifies said gain state to a second gain state value, and iteratively outputs said at least one second signal to said processing circuit while iteratively operating in said second predetermined gain state value, until said at least first signal produced by said at least one photosensor is not saturated.

5. The laser light receiver of claim 1, wherein said unwanted interference light signal comprises electromagnetic energy produced by at least one of: (a) a fluorescent light source, and (b) a strobe light source.

6. The laser light receiver of claim 1, wherein:

(a) said predetermined transmittance characteristics of said at least one optical filter sufficiently pass wavelengths in all of: (i) said green visible light range; (ii) said red visible light range, and (iii) an infrared light range; and (b) said predetermined frequency sensitivity characteristic of said at least one photosensor includes a sufficient sensitivity to electromagnetic energy in all of: (i) said green visible light range; (ii) said red visible light range, and (iii) said infrared light range;

and therefore, said laser light receiver operates as an elevation detection device for laser transmitters which output laser light in all of the visible green, visible red, and infrared light wavelengths.

7. The laser light receiver of claim 1, wherein said third signal produced by said output circuit is used to drive at least one of:

(a) a display that is visible to a user; and (b) a machine.

8. A laser light receiver, comprising:

a processing circuit, at least one photosensor, a variable sensitivity control circuit, an output circuit, and at least one optical filter;

wherein:

(a) said at least one optical filter exhibits a high-pass wavelength optical transmittance characteristic so as to effectively pass a range of wavelengths of electromagnetic energy above and including a green visible light spectrum through an infrared light spectrum, such that electromagnetic energy passing through said at least one optical filter will impact upon said at least one photosensor;

(b) said at least one photosensor exhibits a predetermined frequency sensitivity characteristic so as to be sufficiently sensitive to electromagnetic energy in a range of visible light above and including green visible light through an infrared spectrum; and said at least one photosensor, after receiving a sufficient amount of electromagnetic energy that impacts thereon, outputs at least one first signal to said variable sensitivity control circuit, which modifies said at least one first signal according to a gain state of said variable sensitivity control circuit to produce at least one second signal, and outputs said at least one second signal to said processing circuit;

(c) said laser light receiver is positioned within a space so as to intercept pulses of laser light, which represent a desired source of electromagnetic energy that impacts said at least one photosensor; and (d) said laser light receiver is configured to evaluate said at least one second signal and, based upon a value of said at least one second signal, to determine a relative elevation of said at least one photosensor with respect to received pulses of laser light impacting said at least one photosensor, and, using said output circuit, to output a third signal to provide an indication of said determined relative elevation, and can effectively operate as an elevation detector while operating in a fluorescent light environment, by its ability to distinguish said received pulses of laser light impacting said at least one photosensor from an unwanted interference light signal produced by other light sources, wherein:

(e) said gain state of said variable sensitivity control circuit is controlled by one of: (i) an automatic gain control circuit that is included in said variable sensitivity control circuit, and operates in conjunction with said processing circuit; and (ii) a manually controlled command that is entered by a user using at least one user-actuated control input device; and (f) said unwanted interference light signal is inhibited from causing a false elevation reading at a rejection rate that is determined by said gain state.

9. The laser light receiver of claim 8, wherein said pulses of laser light are output by rotating laser transmitter, which creates a plane of laser light that represents a predetermined elevation on a jobsite.

10. The laser light receiver of claim 8, wherein said unwanted interference light signal comprises electromagnetic energy produced by at least one of: (a) a fluorescent light source, and (b) a strobe light source.

11. The laser light receiver of claim 8, wherein said third signal drives at least one of:
(a) a display that is visible to a user; and
(b) a machine.

12. A method for using a laser light receiver as a relative elevation detector, said method comprising:
(a) providing a processing circuit, at least one optical filter that receives pulses of laser light energy, at least one photosensor, a variable sensitivity control circuit, and a housing, all combined as a unitary device;
(b) passing a portion of electromagnetic energy, including said received pulses of laser light energy, through said at least one optical filter, in which said passed portion of electromagnetic energy is controlled by predetermined transmittance characteristics of said at least one optical filter, such that said predetermined transmittance characteristics sufficiently pass wavelengths in both the green and red visible light ranges;
(c) allowing said passed portion of electromagnetic energy to impact upon said at least one photosensor, in which said at least one photosensor exhibits a predetermined frequency sensitivity characteristic so as to be sufficiently sensitive to electromagnetic energy in both the green and red visible light ranges;
(d) producing at least one first signal by said at least one photosensor, after receiving a sufficient amount of electromagnetic energy that impacts thereon, and directing said at least one first signal to said variable sensitivity control circuit;
(e) modifying, by said variable sensitivity control circuit, said at least one first signal according to a gain state of said variable sensitivity control circuit, and producing at least one second signal, and directing said at least one second signal to said processing circuit;
(f) evaluating said at least one second signal and, based upon a value of said at least one second signal, determining a relative elevation of said at least one photosensor with respect to said received pulses of laser light energy that impact thereon;
(g) indicating said determined relative elevation;
(h) effectively rejecting an unwanted interference light signal that may be included in said at least one second signal, by preventing said unwanted interference light signal from causing a false indication of said determined relative elevation; and
(i) controlling said gain state of said variable sensitivity control circuit by one of: (i) an automatic gain control circuit that is included in said variable sensitivity control circuit, and operates in conjunction with said processing circuit; and (ii) a manually controlled command that is entered by a user using at least one user-actuated control input device;
wherein said step of effectively rejecting an unwanted interference light signal comprises: inhibiting a false elevation reading at a rejection rate that is determined by said gain state.

13. The method of claim 12, wherein said received pulses of laser light are output by rotating laser transmitter, which creates a plane of laser light that represents a predetermined elevation on a jobsite.

14. The method of claim 12, wherein said unwanted interference light signal comprises electromagnetic energy produced by at least one of: (a) a fluorescent light source, and (b) a strobe light source.

15. A method for using a laser light receiver as a relative elevation detector, said method comprising:
(a) providing a processing circuit, at least one optical filter that receives pulses of laser light energy, at least one photosensor, a variable sensitivity control circuit, and a housing, all combined as a unitary device;
(b) passing a portion of electromagnetic energy, including said received pulses of laser light energy, through said at least one optical filter, in which said passed portion of electromagnetic energy is controlled by predetermined transmittance characteristics of said at least one optical filter, such that said predetermined transmittance characteristics sufficiently pass wavelengths in both the green and red visible light ranges;
(c) allowing said passed portion of electromagnetic energy to impact upon said at least one photosensor, in which said at least one photosensor exhibits a predetermined frequency sensitivity characteristic so as to be sufficiently sensitive to electromagnetic energy in both the green and red visible light ranges;

(d) producing at least one first signal by said at least one photosensor, after receiving a sufficient amount of electromagnetic energy that impacts thereon, and directing said at least one first signal to said variable sensitivity control circuit;

(e) modifying, by said variable sensitivity control circuit, said at least one first signal according to a gain state of said variable sensitivity control circuit, and producing at least one second signal, and directing said at least one second signal to said processing circuit;

(f) evaluating said at least one second signal and, based upon a value of said at least one second signal, determining a relative elevation of said at least one photosensor with respect to said received pulses of laser light energy that impact thereon;

(g) indicating said determined relative elevation; and (h) effectively rejecting an unwanted interference light signal that may be included in said at least one second signal, by preventing said unwanted interference light signal from causing a false indication of said determined relative elevation;

wherein said gain state of said variable sensitivity control circuit is controlled by a manual command entered by a user using at least one user-actuated control input device, and further comprising the steps of:

(i) setting said gain state to a maximum operating range, and determining if said laser light receiver is now in a gain state that is too sensitive to fluorescent light sources at a particular physical location on a jobsite;

(j) if said gain state is too sensitive at step (a), then iteratively setting said gain state to a lower operating range until said laser light receiver is no longer too sensitive to fluorescent light sources; and (k) continuing to operate said laser light receiver at said gain state of the lowered operating range.

16. The method of claim 15, wherein said received pulses of laser light are output by rotating laser transmitter, which creates a plane of laser light that represents a predetermined elevation on a jobsite.

17. The method of claim 15, wherein said unwanted interference light signal comprises electromagnetic energy produced by at least one of: (a) a fluorescent light source, and (b) a strobe light source.

18. A laser light receiver, comprising:
a processing circuit, at least one photosensor, a variable sensitivity control circuit, and at least one optical filter; wherein:

(a) said at least one optical filter exhibits an optical characteristic so as to allow only wavelengths of electromagnetic energy at predetermined transmittance characteristics to pass therethrough to impact upon said at least one photosensor;

(b) said at least one photosensor exhibits a frequency sensitivity characteristic so as to be sufficiently sensitive to electromagnetic energy at predetermined frequency response characteristics; and said at least one photosensor, after receiving a sufficient amount of electromagnetic energy that impacts thereon, outputs at least one first signal to said variable sensitivity control circuit, which modifies said at least one first signal to produce at least one second signal, and outputs said at least one second signal to said processing circuit;

(c) a combination of: (i) said predetermined transmittance characteristics of said at least one optical filter; (ii) said predetermined frequency response characteristics of said at least one photosensor; and (iii) amplification characteristics of said variable sensitivity control circuit, produces an overall operating sensitivity characteristic at various wavelengths of received electromagnetic energy, such that said laser light receiver exhibits an overall operating sensitivity characteristic at green visible light wavelengths that is substantially reduced compared to an overall operating sensitivity characteristic at infrared light wavelengths, while still effectively detecting electromagnetic energy in all three wavelength ranges of: green visible light, red visible light, and infrared light;

(d) said laser light receiver is configured: (i) to evaluate said at least one second signal and, based upon a value of said at least one second signal, to determine a relative elevation of said at least one photosensor with respect to said received electromagnetic energy that impacts thereon for all three wavelength ranges of: green visible light, red visible light, and infrared light of said received electromagnetic energy, and (ii) to output a third signal to provide an indication of said determined relative elevation; and said overall operating sensitivity characteristic at green visible light wavelengths is in the range of about 10-50% of said overall operating sensitivity characteristic at infrared light wavelengths.

19. The laser light receiver of claim 18, wherein:

(a) said overall operating sensitivity characteristic at green visible light wavelengths is about 20% of said overall operating sensitivity characteristic at infrared light wavelengths; and (b) said overall operating sensitivity characteristic at red visible light wavelengths is at least about 50% of said overall operating sensitivity characteristic at infrared light wavelengths.

\* \* \* \* \*